US010867487B2

(12) United States Patent
Eddins et al.

(10) Patent No.: US 10,867,487 B2
(45) Date of Patent: *Dec. 15, 2020

(54) COLOR-CHANGING LIGHTING DYNAMIC CONTROL

(71) Applicant: Inception Innovations, LLC, Southlake, TX (US)

(72) Inventors: Scott Eddins, Southlake, TX (US); Kenneth Glover, Southlake, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/718,121

(22) Filed: Dec. 17, 2019

(65) Prior Publication Data

US 2020/0126372 A1 Apr. 23, 2020

Related U.S. Application Data

(63) Continuation of application No. 15/570,352, filed as application No. PCT/US2016/040216 on Jun. 29, 2016, now Pat. No. 10,510,222.

(60) Provisional application No. 62/154,568, filed on Apr. 29, 2015.

(51) Int. Cl.
G08B 5/36 (2006.01)
G08B 21/18 (2006.01)
G08B 27/00 (2006.01)
H04L 12/28 (2006.01)
H05B 47/19 (2020.01)
H05B 47/105 (2020.01)
H05B 47/175 (2020.01)
G08B 25/12 (2006.01)
H05B 45/20 (2020.01)

(52) U.S. Cl.
CPC ............... *G08B 5/36* (2013.01); *G08B 21/18* (2013.01); *G08B 27/005* (2013.01); *H04L 12/2825* (2013.01); *H05B 47/105* (2020.01); *H05B 47/175* (2020.01); *H05B 47/19* (2020.01); *G08B 25/12* (2013.01); *H04L 2012/285* (2013.01); *H05B 45/20* (2020.01)

(58) Field of Classification Search
CPC ........ G08B 5/36; G08B 21/18; G08B 27/005; H05B 47/175; H05B 47/19; H05B 47/105; H04L 12/2825
USPC ...................................... 340/691.8
See application file for complete search history.

(56) References Cited

U.S. PATENT DOCUMENTS

| 6,693,534 | B2* | 2/2004 | Costa | G08B 13/19626 |
| | | | | 340/287 |
| 7,529,351 | B2* | 5/2009 | Binning | H04L 12/66 |
| | | | | 379/45 |
| 8,520,068 | B2* | 8/2013 | Naidoo | G08B 13/19645 |
| | | | | 348/143 |
| 10,510,222 | B2* | 12/2019 | Eddins | G08B 5/36 |
| 2006/0009190 | A1* | 1/2006 | Laliberte | H04L 29/06027 |
| | | | | 455/404.1 |

(Continued)

*Primary Examiner* — John A. Tweel, Jr.
(74) *Attorney, Agent, or Firm* — Booth Albanesi Schroeder PLLC; Peter V. Schroeder

(57) ABSTRACT

A method is presented for alerting persons of an emergency situation in a public space having an emergency colored-lighting alarm system. In response to a user actuating an alarm panel to indicate a type of emergency, the colored-lighting alarm system displays a color-coded lighting message corresponding to the emergency type. The color-coded message can include repeatedly or alternatingly emitting a colored light.

11 Claims, 14 Drawing Sheets

(56) References Cited

U.S. PATENT DOCUMENTS

| | | | |
|---|---|---|---|
| 2006/0076908 A1* | 4/2006 | Morgan | H05B 45/22 |
| | | | 315/312 |
| 2008/0118039 A1* | 5/2008 | Elliot | H04L 12/66 |
| | | | 379/45 |
| 2011/0261206 A1* | 10/2011 | Thomas | G05B 15/02 |
| | | | 348/159 |
| 2014/0084165 A1* | 3/2014 | Fadell | H02J 13/0013 |
| | | | 250/340 |
| 2016/0081166 A1* | 3/2016 | Eddins | G08B 5/36 |
| | | | 315/294 |
| 2016/0165694 A1* | 6/2016 | Pederson | H05B 47/19 |
| | | | 315/131 |
| 2017/0238393 A1* | 8/2017 | Eddins | H05B 47/175 |
| | | | 340/691.8 |

\* cited by examiner

COLOR-CHANGING LIGHTING DYNAMIC CONTROL

CROSS-REFERENCE TO RELATED APPLICATION

This is a Continuation Application and claims priority to U.S. Non-Provisional application Ser. No. 15/570,352, filed Oct. 29, 2017 (now issued U.S. Pat. No. 10,510,222), PCT Application No. PCT/US2016/040216, filed Jun. 29, 2016, and U.S. Provisional Application No. 62/154,568, filed Apr. 29, 2015.

FIELD OF INVENTION

The present disclosure is in the technical field of remote, color-changing lighting control. More particularly, the present disclosure relates to controlling color-changing lighting systems at remote locations to communicate information such as the existence and type of an emergency in real-time.

BACKGROUND

Residences, businesses, and other organizations are using color-changing and mode-changing lighting for aesthetic and functional purposes, especially as architectural lighting. The flexibility of changeable lighting reduces the need for special purpose and seasonal lighting. However, active control of such changeable lighting is time-consuming, user-intensive, or requires expensive equipment, especially for creating multi-color color-changing "scenes" or patterns for seasonal or informational display. Additionally, improvements are always wanted in the accuracy of emergency information, the efficiency of its dissemination to first responders and the public, and the universality of easily remembered and used codes to indicate or report an emergency.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION

Figure 1:
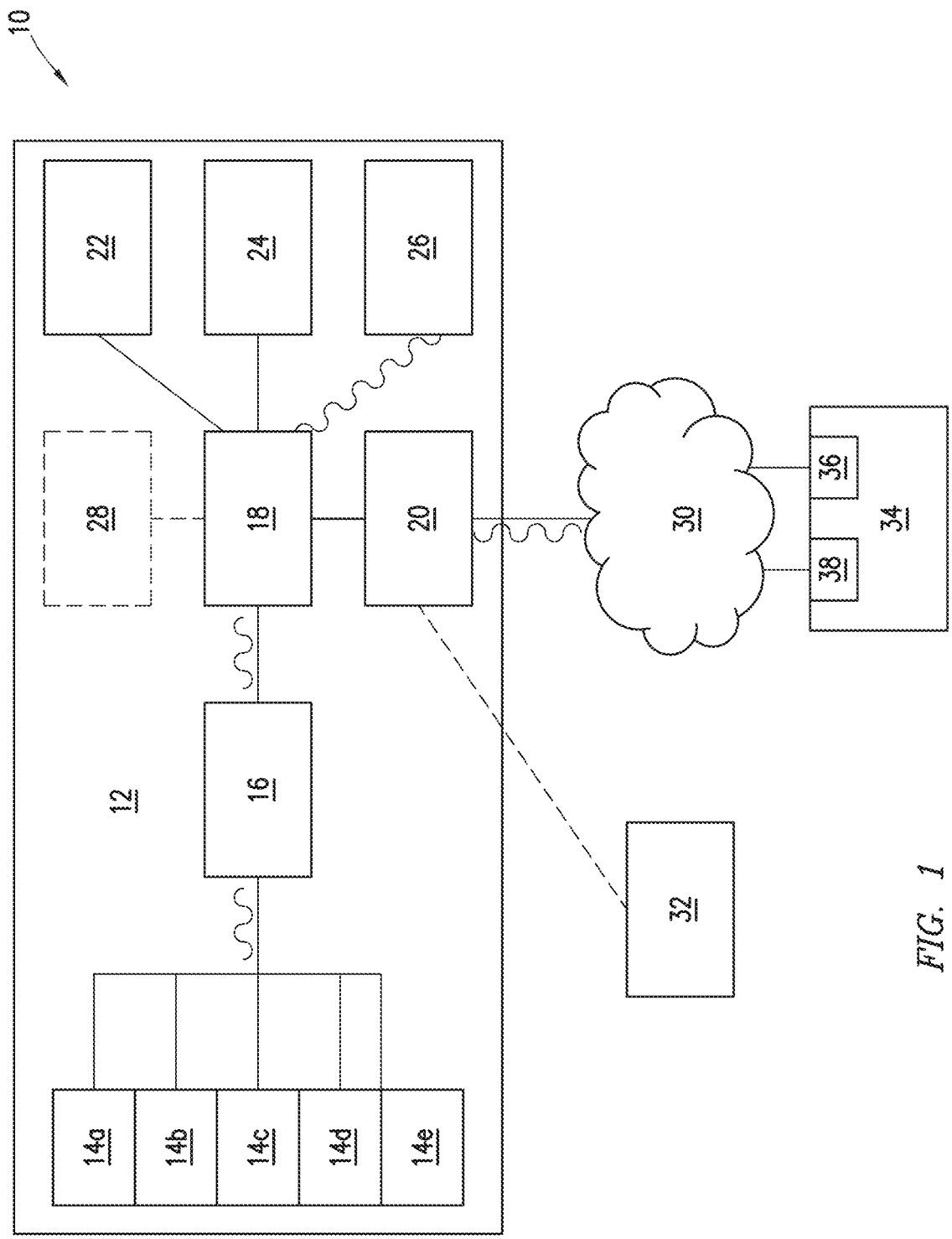
FIG. 1 is a schematic of an exemplary computerized architecture according to an aspect of the invention.

The present inventions and disclosures are described by reference to drawings showing one or more examples of how the inventions can be made and used. In these drawings, reference characters are used throughout the several views to indicate like or corresponding parts. In the description which follows, like or corresponding parts are marked throughout the specification and drawings with the same reference numerals, respectively. The drawings are not to scale and proportions of certain parts have been exaggerated to better illustrate details and features.

Color-Changing Lighting

Installation and use of color-changing lighting has become more common, especially as architectural lighting, both on the exterior and interiors of buildings and homes. Use of color-changing lighting has increased with the availability and affordability of color-changing LED lighting and light strips. Residences, businesses, closed communities, institutions, and governmental organizations are using color-changing and mode-changing lighting for aesthetic and functional purposes. The ability to change lighting colors and modes provides flexibility in lighting to meet temporary needs or repeated conditions.

Without adequate and relative ease of control of such lighting, however, it is difficult to implement complicated or lengthy color-changing or modality-changing lighting schemes or "scenes." Control is complicated by the fact that color-changing lights often are provided with a controller on a per bulb or per lighting strip basis. Software programs can be created and applied to such lighting, regardless of the number of lights, allowing for greater ease of control. However, such programming is often beyond the capabilities of the typical owner or user, requires time-consuming effort, and may require installation of site-specific hardware and software to enable control.

Further, controlled color-changing lighting can be used for informational purposes. However, for generalized use, the informational lighting needs a standardized scheme (e.g., colors used, sequencing of color changes, timing and duration of colored light, etc.) which can be implemented regardless of physical location and understood by viewers. Such an information scheme can be used by specialized organizations and locations, such as business and educational campuses, factories, refineries, mining facilities, governmental organizations and installations, etc. Methods and apparatus are presented to remotely control, via the internet, color-changing lighting at a site, to communicate information, provide artistic displays, such as lighting "scenes" (e.g., holidays), to create aesthetically appealing and changeable lighting, etc. A color-changing lighting standard is presented for use in emergency information transmission such that first responders can readily identify compromised sites, the type of emergency indicated, and whether the emergency has been verified. Further, through connectivity on the internet or similar network, remote control of the color-changing lighting is enabled such that persons located remote to the site can activate, deactivate, and alter the color-changing lighting scheme.

Home and Building Automation Systems

Home automation systems are becoming common. Home automation systems provide for on-demand, rule-based, and/or calendared automated control of various household systems, such as lighting, locks, appliances, watering systems, home entertainment, and security systems. Typically, home automation systems utilize a home network including a local controller integrated with the various home computerized or automated devices and systems to be controlled. The local controller can be resident on a personal computer, tablet, smartphone, or dedicated device and utilizes a GUI to interface with the user. The controller provides permanent or selective connectivity to the internet (or other similar network) such that home systems can be remotely operated from devices also connected to the internet (e.g., smartphone, remote computer, etc.). Some home automation systems also provide for local and remote calendaring of control events, such as a time-activated change in thermostat setting. Further, home automation systems often provide messaging or alert services wherein the local controller sends messages or alerts to the user's remote device or to a third-party such as a monitoring or managing services provider.

Home automation systems often also provide or network with existing home security systems. The security system, either directly or through the home automation system can communicate with a monitoring service provider, an official emergency messaging provider (such as a PSAP of the Enhanced 9-1-1- system), etc. Security systems often include control of local audio devices (e.g., sirens and intercom systems) and lighting devices (e.g., strobe lights) as well as communication devices.

Building automation systems provide similar networking and control capabilities in commercial buildings, institutions, campuses, etc. for controlling the devices resident at such locations. Similarly, remote automation control can be applied to governmental and other institutional entities, such as street lighting, traffic lights, public alert systems, etc.

FIG. 1

FIG. 1 is a schematic of an exemplary computerized architecture according to an aspect of the invention. A premises 10, such as a house, business, etc., has a private network 12, home network, premises network, user network, or similar. The network 12 will be referred to herein as a "private" network to distinguish it from the internet and other similar "public" networks, although the private network can have multiple authorized users. Further, the private network has connectivity (i.e., is continuously or selectively connected or connectable) to a public network, such as the internet, or a dedicated long-distance network. The premises network connects to a remote, content management network, which is also typically private in that it is operated and accessible by a particular service provider and its authorized users. These networks are separately owned, maintained, and/or are resident on separately owned and/or maintained facilities. Hence the term "remote" indicates that the premises network and provider and other networks are operably connected but not all local to one another. Similarly, the term "remote" is used to refer to use of a public network, such as the internet, to control the home automation controller and/or connected home systems.

The remote private network 12 can have multiple components, including hardware, software, appliances, etc. The illustrated private network includes color-changing lights 14, a color-changing light controller 16, a purpose-specific control gateway 18, an IP addressable router 20, a personal computer 22, laptop or notebook 24, and a mobile phone (or other mobile device) 26. The private network need not include all these exemplary devices and can include additional or substitute devices. Communication between various devices can be by wire, wireless, infrared, radio frequency, Ethernet, ZigBee, or any other technology known or later developed regardless of the wired-wireless indications on the Figures and herein.

The remote private network 12 can also include and be connected to a security system 28 which may have its own network components such as alarm sirens, sensors (audio, motion, magnetic, etc.), back-up power systems, and communications systems with a security monitoring company, etc. The security system can also interface directly with the components of the remote private network 12, such as the personal computer 22, mobile device 26, color-changing light controller 16, etc. The security system can be a stand-alone system or part of a broader home or building automation system and can connect to a public network via one or more shared or dedicated routers or gateways.

The color-changing lights or light fixtures 14a-e are capable of emitting light of more than one color. Exemplary color-changing lights are RGB LEDs, bi-color LEDs, flashing LEDs, digital RGB LEDs, (organic) OLEDs, RGB WLEDs (White LEDs), di-, tri-, and tetra-chromatic white LEDs, and phosphor-based LEDs. Color-changing light fixtures utilize such color-changing lights, with individual lights controlled either individually or as in groups. Exemplary lighting fixtures include, but are not limited to, light strips, light clusters, flexible media lighting, recessed lighting (cans, coves, torches, troffers, etc.), surface mounted lighting (chandeliers, pendants, sconces, track lighting, sign lighting, strip lights, etc.), forward and rear facing lighting, broad and narrow floodlights, floor lights, aisle lights, outdoor, landscape and sport lighting (mast, bollard, yard, etc.), and special-purpose lighting (accent, background, blacklight, strobe, etc.).

The color-changing lights can be wired or wireless. For example, wireless LED light strips are available having the necessary hardware and/or software to communicate with a controller wirelessly. Further, individual LED lights, for use in traditional sockets, are available with their own attached IP-addressable chips or wireless controls. Wireless lights and fixtures can be operated by radio frequency (RF), infrared (IR), or any other remote communications now known or later available. Digital RGB LEDs contain "smart" control electronics providing connections for data-in, data-out, a clock, and/or strobe signal, etc. These digital RGB LEDs can be connected in a "daisy chain" with the data-in of the first LED sourced by a microprocessor which can control the brightness, color, etc., of each LED independently. Such digital RGB LEDs are commercially available, for example, using chips designated WS2811 and WS2812. The color-changing lights or fixtures can further be physically grouped (wired together or controlled by a single ballast) or conceptually grouped (separate ballasts and/or controls, but operated simultaneously and uniformly as a group). For example, multiple lights can be designated as "living room," "theater," "party setting," or "emergency setting" lights. Groups can overlap. For example, the designated emergency lights can be all the lights in the house set to their brightest white, including the living room lights.

The plurality of color-changing lights or light fixtures 14a-e are connected to and controlled by a color-changing light controller 16. Such controllers are commercially available, such as the HDE (trade name) "Magic Lighting" remote control (RC), Pentair's INTELLIBRITE (trade name) controller, ARMACOST (trade name) Lighting, etc., or can be provided specifically with the disclosed apparatus and services. The controller can provide control of light intensity, light color, color-change sequence, color selection, color-change transition effects (fast fade, slow fade, etc.), color-change duration or speed, on/off, and/or flashing or strobe effects. Other control features will be apparent to those of skill in the art.

Gateway and Router

The router 20 provides connectivity with the internet 30, by wire or wirelessly. The internet, World Wide Web, and cloud are understood by those of skill in the art and are terms of art, and will not be described in detail herein. The gateway 18 provides connectivity, via the internet, to a purposed content control server 34. The gateway 18 can be a stand-alone appliance, such as a hand-held or wall-mounted controller, or can be an application or software supplied and accessible from another computer, such as personal computer 22, mobile device 26, notebook 24, etc. The gateway can have the "look and feel" of an application, web page, browser, server interface, etc. The gateway can be operated or controlled by gateway software providing computer executable instructions to the hosting computer or network that, when executed, connects a computer of the remote private network to the content control server. Initially and periodically, gateway software can be uploaded to the private network.

Remote Content Management Network

A remote, content management network 32 has connectivity to the administrative server 34, for example, via the internet 30. The content management network 32 can include servers (actual or virtual), and other hardware and software, and other network devices. The exemplary content management network 32 is independent from the administrative server 34 and the private network 12. The remote content management network 32 stores and manages provider color-changing light content, such as software programs for controlling color-changing lights or controllers. The lighting control content made available by the content management network can be lighting control software, lighting control streaming content, calendaring software or data, lighting control or controller activation software or data, use-management software or data, interface or protocol software, software or data for synchronization of lighting control to a real-time event (e.g., a sporting event, game, awards show, etc.), software or data for synchronization of lighting control to specified audio or audio-visual content (e.g., a movie, song, etc.), software for controlling lighting in response to sensed audio, visual, or audio-visual stimuli (e.g., as sensed by on-location sensors, etc.), subscription software or data, software or data for control of security or emergency lighting, and any combination thereof. The lighting control content transmitted to the private network, upon execution, controls a color-changing light controller or color-changing lights located on the private network 12 or premises 10.

Administrative Server

The administrative server 34 can be an actual or virtual server, multiple servers, and can include further hardware, software, and networked devices. The administrative server 34 can be partitioned, aggregated, etc., as is known in the art. The administrative server 34 includes stored data and programs, such as provider content, gateway software, user accounts, verification protocol software, etc. The administrative server serves as an administrator for controlling access to and transmission of data, content, programs, and network and user identification data, from and to the administrative server. The administrative server is web-hosted or internet-hosted and accessed via the internet. The administrative server can be connected to or accessed through a web page, via an internet browser or application, etc.

The administrative server 34 transmits (e.g., pushes, uploads, etc.) data, such as color-changing lighting control content, to the user or private network. Conversely, the private network downloads or pulls data from the administrative server. Similarly, the content management network 32 transmits data, such as color-changing lighting control content, to the administrative server 34. Conversely, the administrative server downloads or pulls data from the content management network.

The administrative server 34 acts as an administrator by controlling who accesses the administrative server, what content is available to the accessing party, what can be downloaded or uploaded to the administrative server, etc. The administrative server accesses, controls, monitors, and tracks content, and can provide accounting, logging, identification, verification, and other management functions. The administrative server can also be employed to maintain individual user accounts 36, for example, on a user account server, corresponding to a user's remote private network. The user account server can be real or virtual and can reside on or be controlled by the administrative server. Similarly, the administrative server can be employed to maintain individual provider accounts 38, for example, on a provider account server, corresponding to a plurality of remote content management networks. The provider account server can be real or virtual and can reside on or be controlled by the administrative server.

The administrative server 34 administers access by a user of a remote private network to lighting control content on the lighting control server. For example, such administration can include identifying and verifying the user of a remote private or content management network before allowing further interaction with the administrative server. Identification and verification can include cross-indexing IP addresses, virtual keys, requiring user name and password, etc., as is known in the art.

Further, administration can include collecting individual user data corresponding to a remote private network. Administering access by a user of a remote private network can include collecting, storing, and associating user data with the corresponding user account. Individual user data can include user name, user password, user IP address, user physical address, lighting controller data, lighting fixture data, lighting location data, lighting grouping data, lighting color data, calendaring data, security system data, subscription data, or permissions for real-time lighting control by a subscription or security administrator. User data can also include selection of lighting control content; selection of subscription services for lighting control content; selection of authorized administrators having access to the user's private network; selection of times authorized administrators have access to the user's private network; selection of events when lighting control is desired (e.g., weather service warnings); calendaring of events when lighting control is desired (e.g., game days); calendaring and indication of times when the user is absent or present on the premises; identification and information relating to the user's color-changing lighting system; identification of the number, type, specifications, and location of lighting sources installed at the user's premises; designation of light sources or locations for a specific purpose (e.g., theater lighting); and any combination thereof.

The administrative server can also, in one embodiment, connect to the remote private network and control the color-changing light system in response to occurrence of: a selected event, a calendared event, an event related to a selected subscription, or an event identified by a subscription provider. Alternately, the administrative server can control the color-changing system in real time in response to real time events (e.g., weather warning, touchdown). The content transmitted to the remote private network can be executable software to control the color-changing light system upon occurrence of an event (e.g., alarm, start of movie) or calendared event.

The administrative server can administer transmission of lighting control content from a remote content management network directly to a remote private network, as indicated by the dashed line in FIG. 1, including identifying and verifying the remote content management network and the remote private network, and transmitting data regarding verification to at least one of the remote content management network and remote private network.

FIG. 2

Figure 2:
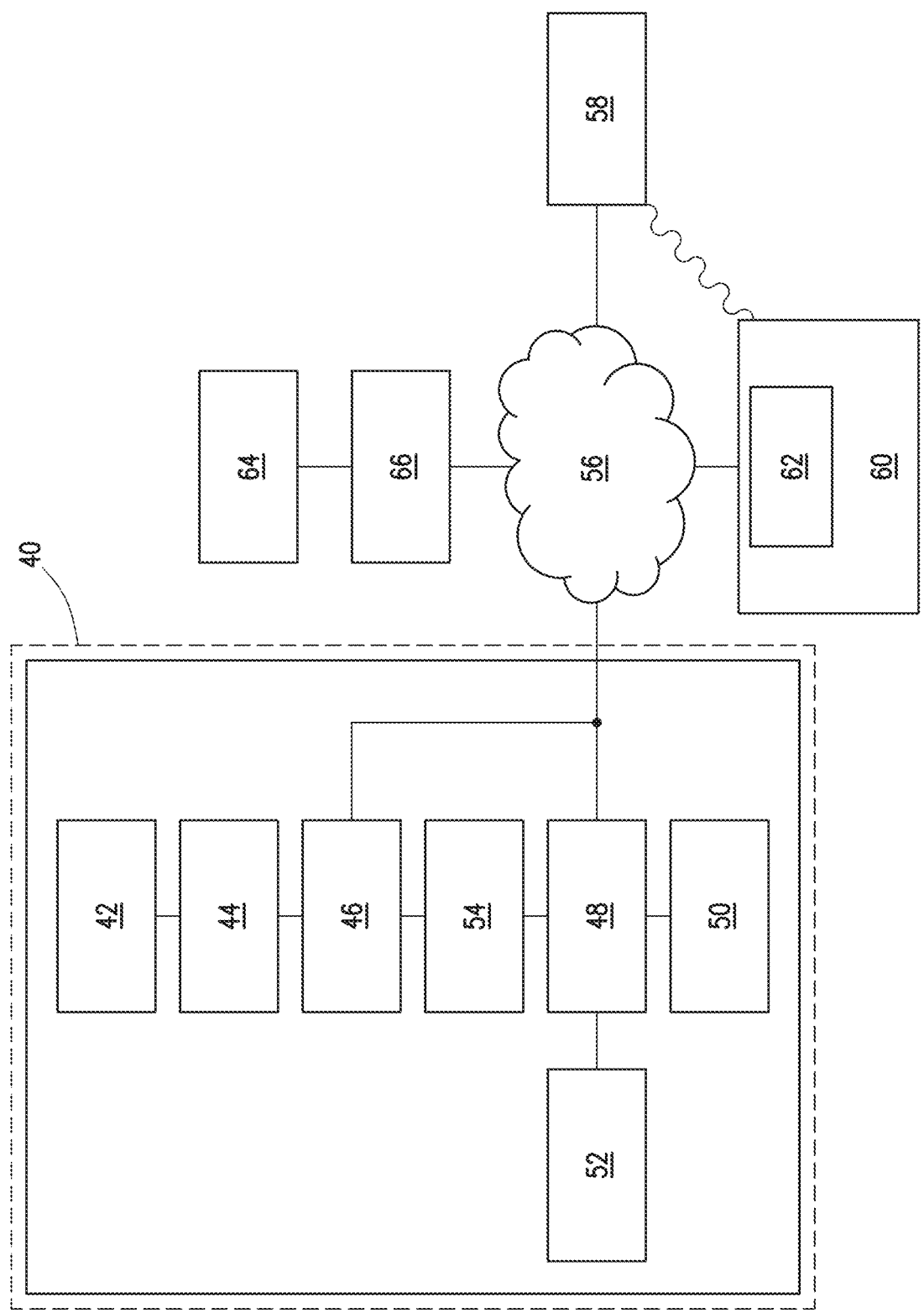
FIG. 2 is a schematic of an exemplary computerized architecture according to an aspect of the invention.

FIG. 2 is a schematic of an exemplary computerized architecture according to an aspect of the invention. FIG. 2 is similar to FIG. 1 and will not be described in detail to avoid redundancy.

FIG. 2 illustrates a system for providing color-changing light control at a premises as part of a security or Enhanced 9-1-1 system. The premises 40 includes color-changing lights 42, a color-changing light controller 44, a gateway and router 46, as well as a computerized security system 48 having its own security network including items such as security input devices 50 (e.g., motion sensors, magnetic sensors for indicating whether doors or windows are open or closed, audio sensors such as those that detect breaking glass, smoke and gas detectors, etc.) and security network output devices 52 (e.g., sirens, strobe lights, automatically locking doors, etc.).

In one embodiment, the security system 48 and gateway 46 or controller 44 communicate directly, sharing a protocol or using an application programming interface (API) 54. Alternately, the security system and light control gateway or controller can be part and parcel of the same system, commonly controlled and monitored.

The security system and/or the gateway have connectivity to the internet 56. The security system and/or light control system can be monitored by a security monitoring company (e.g., ADT (trade name)) having its own network or server 58 connectable to the internet. The monitoring company communicates with the 9-1-1 or Enhanced 9-1-1 network 60, typically through a Public Safety Answering Point (PSAP) 62. This communication can be via telephone, internet, or other communications system.

The administrative server 64 is connected to the internet 56 and identifies and verifies, at 66, the security system or private network sending an alarm or other communication signal. The administrative server communicates with the monitoring server 58 and/or 9-1-1 system 60. The administrative server can, upon a signal from the gateway, the security system, the monitoring network or the Enhanced 9-1-1 network, activate and control the color-changing lights at the private network premises 40. Similarly, the monitoring server 58 can activate and control the color-changing lights. Similarly, the Enhanced 9-1-1 system can directly activate and control the color-changing lights via the private network.

FIG. 3

Figure 3:
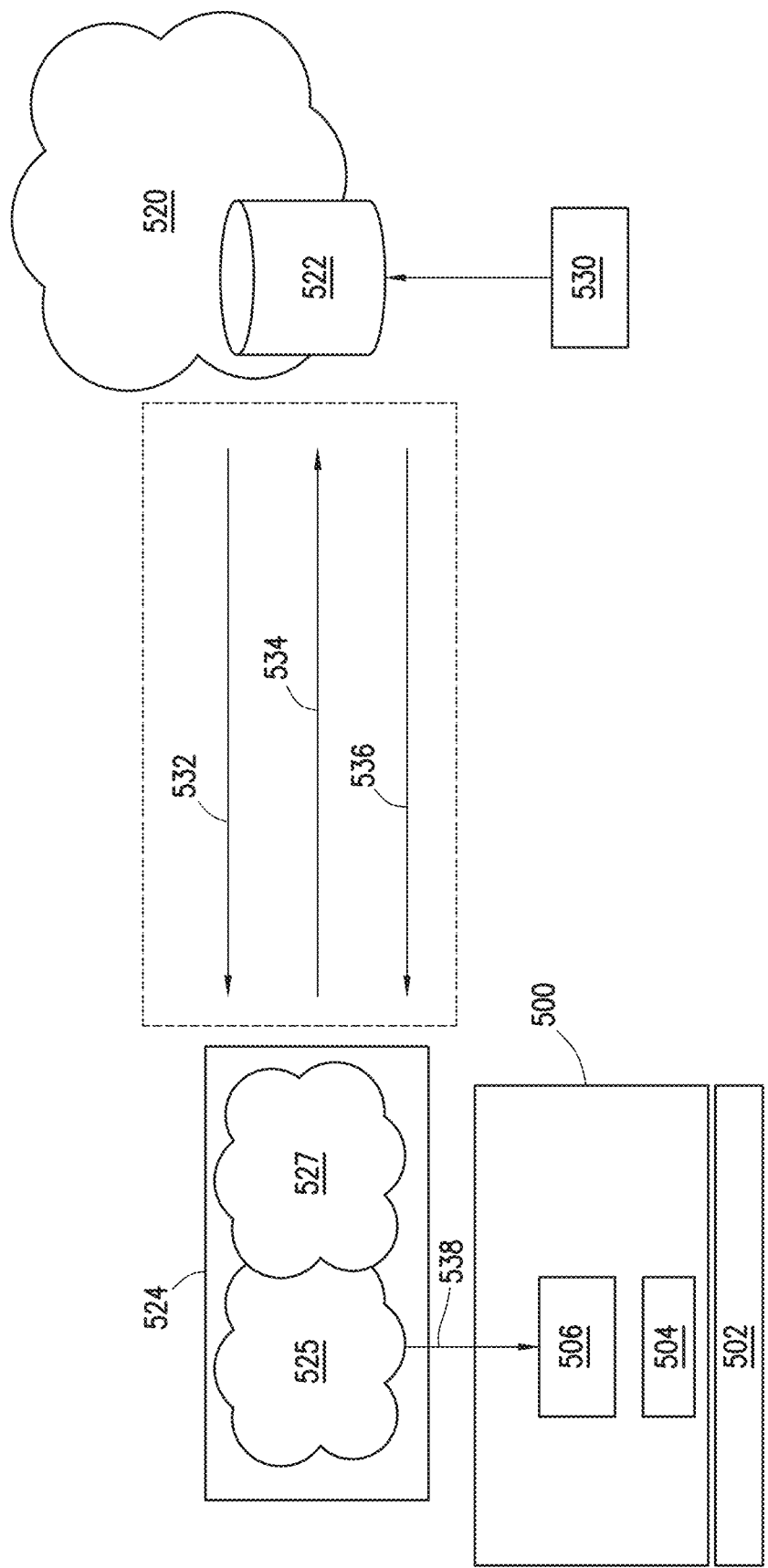
FIG. 3 is a schematic of an exemplary computerized architecture according to an aspect of the disclosure illustrating implementation of 9-1-1 communications through a color-changing lighting service provider.

FIG. 3 is a schematic of an exemplary computerized architecture according to an aspect of the disclosure illustrating implementation of 9-1-1 communications through a color-changing lighting service provider. A management server 524 (or other color changing lighting service provider network devices) directly connects, via the internet, to the premises gateway 506 at the premises 500 to control the color-changing architectural lights 502 via color-changing lighting controller 504. Other hardware, firmware and software can be used at the premises as described elsewhere herein. The management server 524 interfaces with the premises gateway 506 (and user) and has software or software applications 525 operable to control the color-changing lighting. The lighting control application 525 can be resident at the management server, at the premises on a premises computerized device, at a real or virtual server, in the Cloud, at multiple servers and networked devices, or some combination thereof.

Similarly, the management server 524 includes communications software or applications 527 for managing connectivity between the management server 524 and the premises 500 and the 9-1-1 service provider network 520. The premises 500, in one embodiment, is a subscriber to the color-changing architectural lighting service and service provider. The service provider, via its management server 524, controls the premises lighting system and manages connectivity, in this case to a 9-1-1 services provider.

The Enhanced 9-1-1 network 520 includes communications software or applications 522 for communicating with the management server 524. For example, such software can provide and use an integration protocol, communicate with the management server using an appropriate API, control connectivity of the 9-1-1 network to the internet, etc. The 9-1-1 provider cooperates with the color-changing lighting service provider to enable communication between a premises 500 and the 9-1-1 network 520 via the management server 524 by integrating a shared protocol or using an appropriate API. The 9-1-1 provider implements support for communication with the color-changing lighting software and/or provider network. The 9-1-1 communications software 522 embeds the color-changing lighting control API to enable communication with the content server or provider.

In use, an inbound emergency "call" or transmission 530 is received by the Enhanced 9-1-1 provider and provider network 520. The Enhanced 9-1-1 provider, using its network, programs, applications, personnel, and other resources, identifies a premises associated with the inbound call (i.e., the premises from which the emergency call is being transmitted, a premises identified by a caller, etc.).

The 9-1-1 communications software 522 then institutes data signal 532, such as an "API call" to the management server 524, including data such as the address, coordinates, or other identifiers associated with the premises. A typical API call can include a developer "key," GPS latitude and longitude values, location address, and resident, business, or entity name, for example. Since a location may be a residence, business, or general location, minimal values are transmitted so that the content control server can cross-reference subscription verification using any of selected and provided values.

The management server 524 verifies that the premises has an associated account or subscription, typically by checking against one or more databases, and then transmits a corresponding communication 534 back to the 9-1-1 software 522 verifying the subscription, if present. The management server receives, for example, a developer key, GPS values, location address, and resident, business, entity name, via the API call. The developer key is validated against a developer account database to determine if the API call is an authorized 9-1-1 entity. Other information or fields in the API call are used to search for a match in a customer subscription database. If a match is found using any combination of the values provided, it can be determined that the location has color-changing light capability and can proceed with execution of the designated or restricted color-changing lighting scene.

Where a subscription is verified, the 9-1-1 software 522 then transmits an activation communication 536 to the management server 524 to activate an alarm at the premises. The 9-1-1 software also transmits other information, such as the type of emergency, to the management server.

The management server 524 then sends a lighting control communication 538 to the premises system to activate the color-changing architectural lights 502 to display a prescribed "scene" or coded lighting scheme corresponding to the type of emergency. Further emergency indicators such as sirens can also be triggered.

The inbound 9-1-1 call 530 can be a landline call, a mobile phone call, a signal sent upon manual activation of an alarm device on the premises (e.g., a break-and-pull alarm device, activation of a security panel). The call can be initiated from someone at or near the premises, from an alarm monitoring service provider, or from another source. The 9-1-1 call can further be transmitted from various devices, such as from a computer, cellular phone, electronic tablet, etc.

The Enhanced 9-1-1 service provider network 520 can include one or more servers, databases, and other hardware, software and firmware. Elements of the Enhanced 9-1-1 network can be physically located in various locations, on various interconnected servers, etc. The Enhanced 9-1-1 service provider network 520 can be partly or wholly owned, managed, and operated by a governmental entity or a third-party service provider.

FIG. 4

Figure 4:
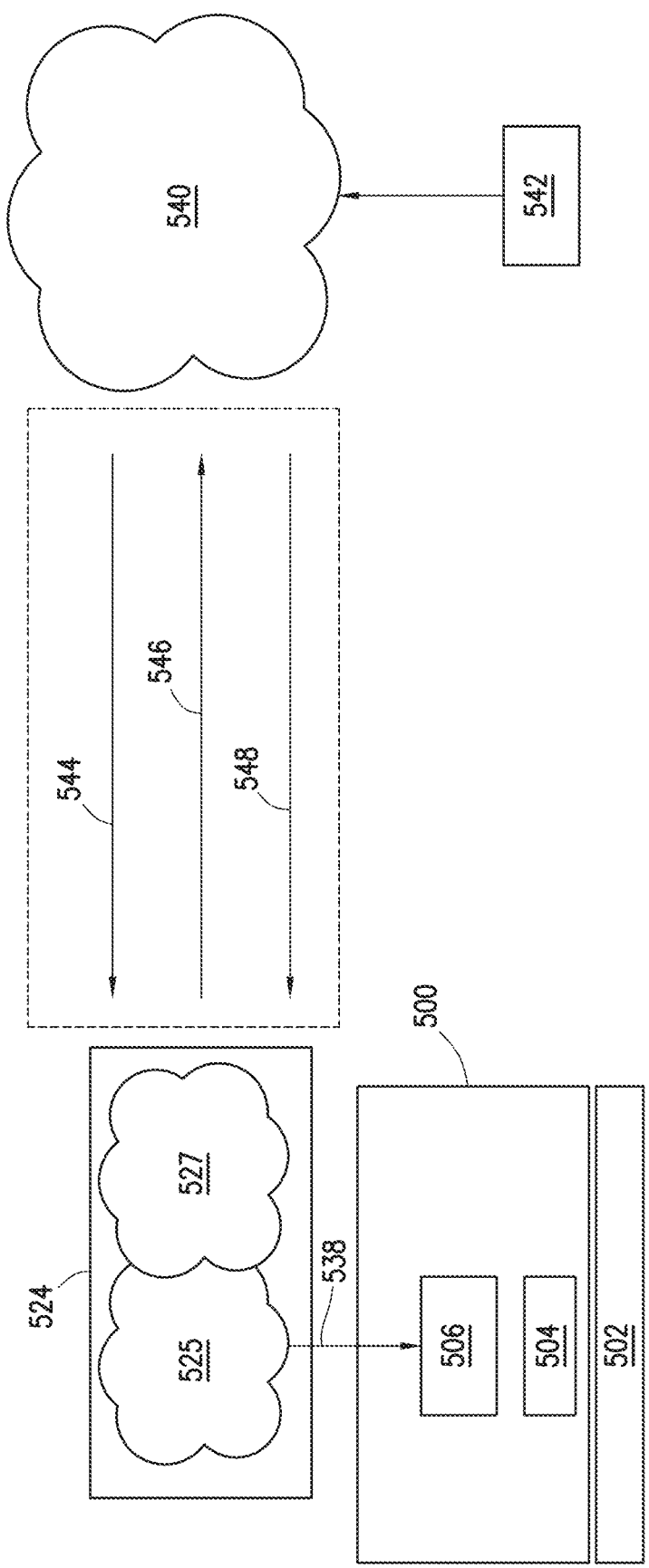
FIG. 4 is a schematic of an exemplary computerized architecture according to an aspect of the disclosure illustrating implementation of emergency communications via a security monitoring provider.

FIG. 4 is a schematic of an exemplary computerized architecture according to an aspect of the disclosure illustrating implementation of emergency communications via a security monitoring provider. This schematic is similar to that described with reference to FIG. 3, with like numbers used for like parts; consequently, FIG. 4 will not be described in detail. Here, the management server 524 and color-changing lighting provider partner with a security monitoring provider having its own network 540 including software, software applications, and/or an API 522 for communicating with the management server 524. Security monitoring service providers include ADT, Brinks Home Security, Trustwove, Vivint, Frontpoint, Protect America, and Protect1.

In use, an inbound emergency alarm, call, or transmission 542 is received by the security monitoring provider and its network 540. The security monitoring provider, using its network 540, personnel, and other resources, identifies a premises associated with the inbound alarm as well as other information, such as the type of emergency reported, verification by the premises resident, etc. The monitoring provider network 540 institutes an API call or communication, using the appropriate API, to the management server 524. The management server 524 verifies that the premises has an account or subscription and transmits a corresponding communication 534 back to the monitoring provider network 540. Where a subscription is verified, the monitoring provider network 540 transmits a communication 536 to the management server 524 to activate an alarm at the premises. The management server 524 then sends a lighting activation communication 538 to the premises system, and the color-changing architectural lights 502 are activated to display a prescribed "scene" or coded lighting scheme corresponding to the type of emergency.

The monitoring provider network 540 can include one or more servers, databases, and other hardware, software and firmware. Elements of the network can be physically located in various locations, on various interconnected servers, etc.

FIG. 5

Figure 5:
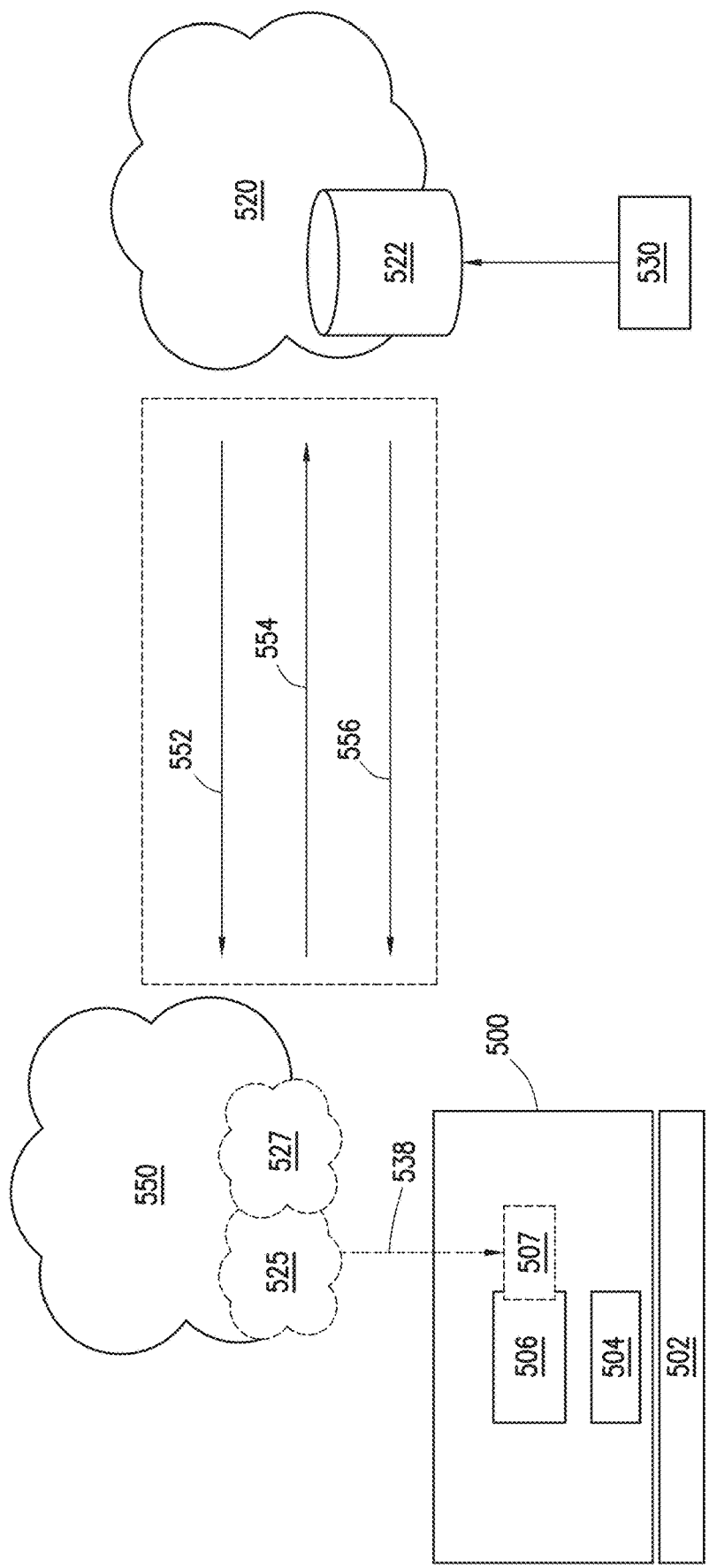
FIG. 5 is a schematic of an exemplary computerized architecture according to an aspect of the disclosure illustrating implementation of emergency communications via a home automation system and provider.

FIG. 5 is a schematic of an exemplary computerized architecture according to an aspect of the disclosure illustrating implementation of emergency communications via a home automation system and provider. Again, this embodiment is similar to those described with reference to FIGS. 3-4, with like numbers used for like parts, and will not be described in detail. Here, the home automation service provider has a network 550, accessible via the internet, and having connectivity to the premises 500, or more specifically to a gateway 506. The gateway 506 can be a generic gateway or a gateway and system proprietary to the home automation services provider and can include software, applications, routers and other hardware and firmware. The network can be web-based, hosted, etc., as is known in the art. Home automation services providers include iControl, Wink, Iris, Mi Casa Verde, Alarm.com, and Google Nest.

The home automation services provider network 550 has included therein color-changing lighting control software 525 for controlling the color-changing architectural lighting 502. Similarly, the home automation network 550 includes communications software 527 for managing connectivity and communication with the gateway 506. The lighting control application 525 can include an API for communicating with the gateway 506. More specifically, in an embodiment, the software and/or applications, 525 and/or 527, for color-changing lighting control communicate with embedded engine software 507 at the gateway 506. The gateway 506 has associated therewith embedded engine software 507 providing support for the color-changing lighting control system. The embedded engine software 507 can be physically resident at the gateway device or on another device connected thereto. The embedded engine software 507 is embedded logic that is required to run on the gateway to, for example, manage lighting scenes for emergency situations, monitor unauthorized use, enable priority overrides, provide multi-gateway synchronization, scheduling, etc.

The embodiment illustrated in FIG. 5 provides an exemplary method for a home automation services provider to offer their users the additional features available through the methods disclosed herein for automating and remotely controlling color-changing architectural lighting, whether as a stand-alone or complimentary aspect of security services or for aesthetic and entertainment purposes. For example, a licensing approach can be used to provide the required logic, software, firmware, and/or hardware components in conjunction with the home automation service provider's system. In the embodiment shown here, the home automation provider's gateway 506 and hosted service 550 require licensed components to allow color-changing lighting control functionality.

The procedure for handling incoming 9-1-1 calls 530, transmissions 552, 554, and 556, between the 9-1-1 system 520 and software 522 and the home automation provider network 550 is similar to that described above herein at FIG. 3 and will not be repeated here.

FIG. 6

Figure 6:
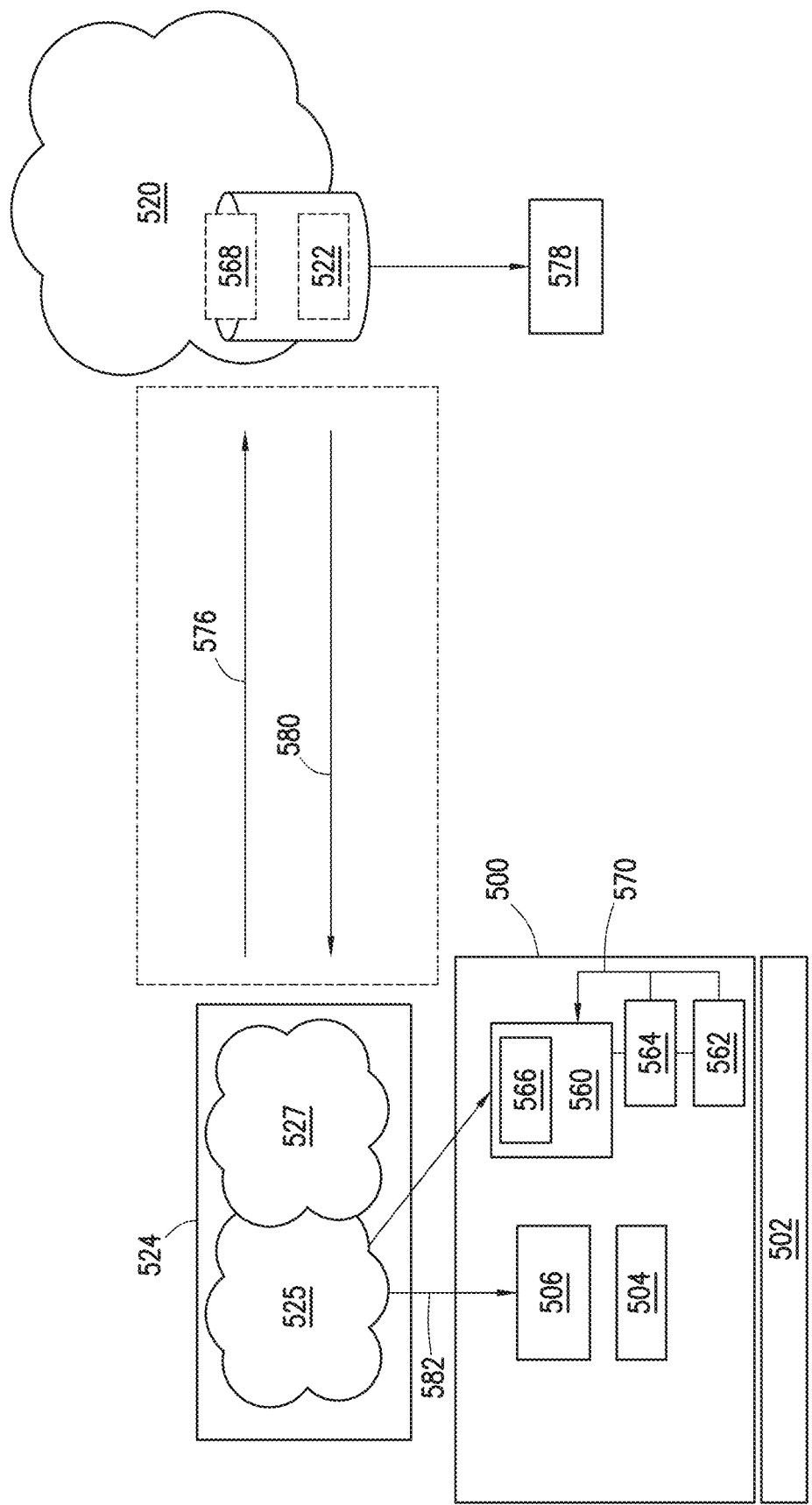
FIG. 6 is a schematic of an exemplary computerized architecture according to an aspect of the disclosure illustrating implementation of emergency communications utilizing an API "callback."

FIG. 6 is a schematic of an exemplary computerized architecture according to an aspect of the disclosure illustrating implementation of emergency communications utilizing an API "callback." The embodiment is similar to those described with reference to the above figures, with like numbers used for like parts, and will not be described in detail. The architecture and methods of FIG. 6 provide alternative and/or additional architecture for connection and interaction with 9-1-1 providers. The solution disclosed in this embodiment uses an API callback method that allows software developers to subscribe to a data channel in their software that will push messages to them when an event occurs in the color changing lighting content or administrative system. This allows additional functionality and enhances the ability to offer various methods of interaction with other systems.

A premises 500 has color-changing hardware on site, namely, color-changing lights 502, a controller 504, and a gateway 506. As with systems described above, the gateway communicates with the management server 524 having software for lighting control 525 and connectivity control 527. Additionally, the premises 500 has a security system having a security panel 560 with user input device 562 (interface, panel, etc.) and various security sensors 564. The security system includes an IP Adapter 566 to connect with the management server 524. An IP Adapter is a common automation product which is commercially available and interfaces with various home alarm panels, such as those available from DSC, Inc. and Honeywell, Inc. A specific solution is the ENVISALINK (trade name) made by Eyezon, Inc., which is an IP bus-level adapter for both the DSC POWERSERIES (trade name) and Honeywell VISTA (trade name) security panels. The product acts as a web server attached to the physical alarm panel which enables remote control and communication via an API.

In use, an alarm or emergency "call" is initiated 570 on the premises at the security system by the user, typically at a security panel 560, or is automatically triggered by one or more sensors 564. Depending on the security system, such actions can activate alarm outputs such as sirens, strobe lights, etc. In an embodiment, the security system can also activate 574 the color-changing lighting 502 directly. The lighting color and timing scene displayed is determined by the type of emergency the user or sensors indicated (e.g., fire, intruder, etc.). Upon alarm activation, the IP Adapter communicates with the management server 524 indicating an emergency call. The IP Adapter 566 determines whether the emergency call was placed manually or automatically (e.g., by one or more sensors). The IP Adapter 566 communicates information to the management server 524 such as zone, zone status, time since tripped, arm, disarm, bypass zone, panel button pressed, duress code input, and any other activity happening in the physical system.

The management server 524 (which can be operated by a third-party such as an alarm monitoring or home automation service) analyzes the incoming call information and verifies whether the premises is associated with a subscription. If so, an emergency signal 576 is communicated via the internet to the 9-1-1 provider 520, its associated software 522 and an associated API callback routine 568. The callback routine (also called a "web hook") allows the software program with the incorporated API to "listen" for any activity associated with a particular entity or device (here, the adapter). The 9-1-1 provider then communicates 578 with someone at or in-charge of the premises 500, such as by landline phone, cell phone, or other communication device, to verify that an emergency exists, the type of emergency, etc., according to 9-1-1 protocols. Upon verification, the 9-1-1 service provider 520 transmits a verification communication 580 including data such as emergency verification, emergency type, and other data, with the management server 524, instructing or alerting the management server to, in turn, activate the color-changing lighting scene at the premises. Additionally, the 9-1-1 service provider can send a communication to the management server to override any currently operating lighting scenes or settings if appropriate. The management server 524 sends an activation communication 582 to the color-changing lighting 502 via the internet, gateway 506, and controller 504.

FIG. 7

Figure 7:
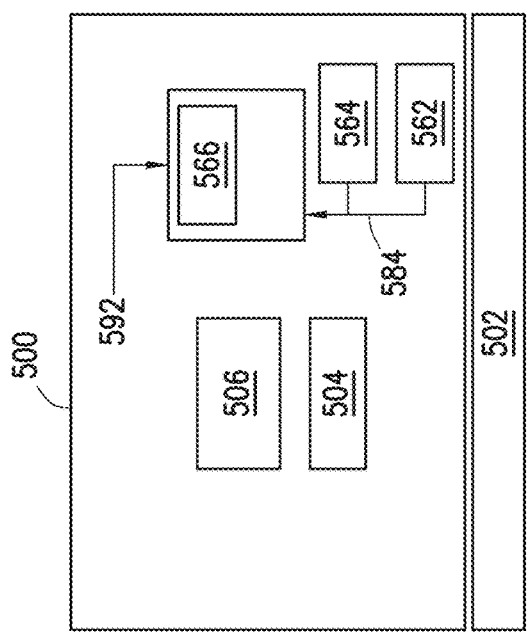
FIG. 7 is a schematic of an exemplary computerized architecture according to an aspect of the disclosure illustrating a method for additional security where the 9-1-1 service provider does not support the color-changing lighting applications.
Figure 7:
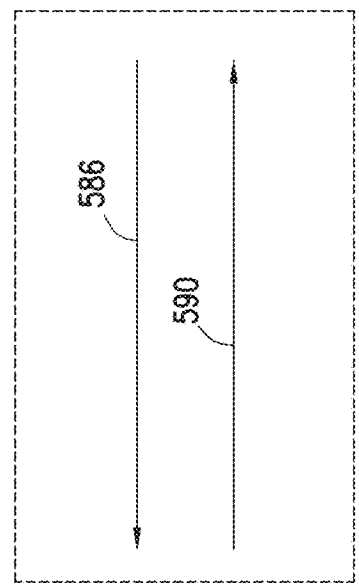
Figure 7:
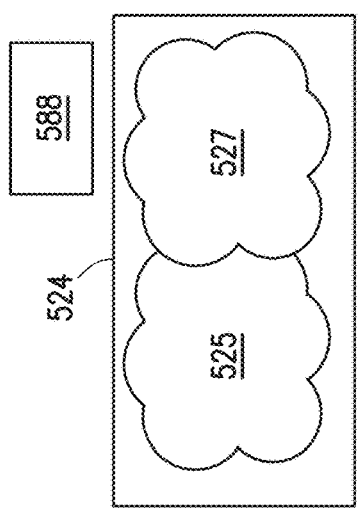

FIG. 7 is a schematic of an exemplary computerized architecture according to an aspect of the disclosure illustrating a method for additional security where the 9-1-1 service provider does not support the color-changing lighting applications. The embodiment is similar to those described with reference to FIG. 3 and following, with like numbers used for like parts, and will not be described in detail. The color-changing lighting control service can provide an additional layer of security for users without an alarm monitoring service and whose local 9-1-1 service provider has not integrated support for the color-changing lighting control service. This may be appropriate in the many homes that once had monitored service but then discontinued service. Alarm system hardware typically remains in the home and localized monitoring continues (by the homeowner or neighbors) with the existing equipment.

In such a case, when an alarm is activated 584 by premises sensors or manually, the local IP Adapter 566 communicates 586 the condition to the management server 524 via internet and using the appropriate API. The management server 524 analyzes the incoming communication and verifies 588 that the premises is associated with a subscriber. Once verified, the server 524 sends a communication 590 to the premises gateway 506 to activate 592 a selected emergency color-changing lighting scene. The activated lights thus provide an external visual indication of a potential emergency condition at that premises, likely to elicit personally placed calls for emergency response.

Figure 8:
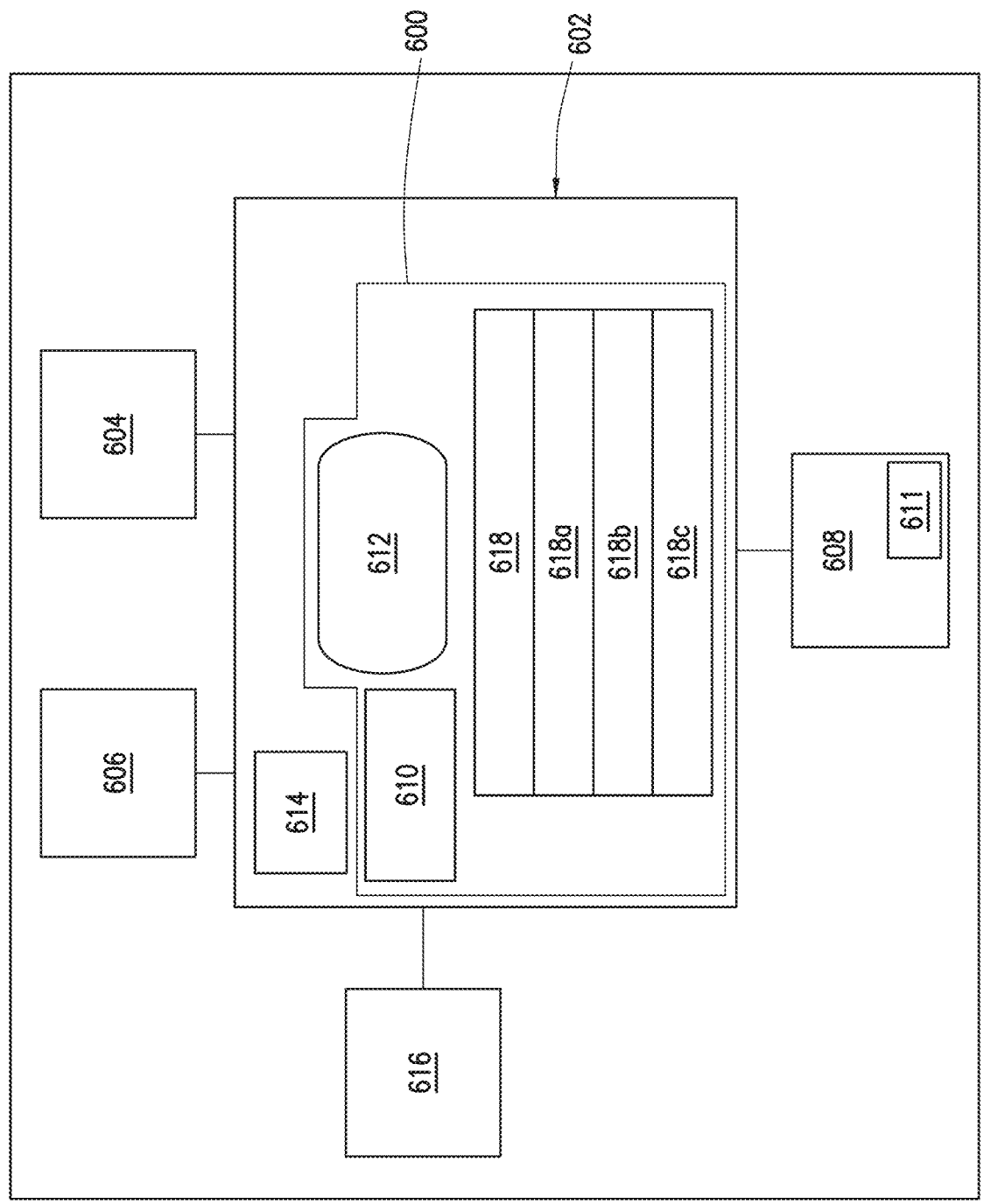
FIG. 8 is a schematic of an exemplary embedded engine operable at a premises gateway of a home automation system or other third-party premises system according to an aspect of the disclosure.

FIG. 8 Embedded Engine

FIG. 8 is a schematic of an exemplary embedded engine operable at a premises gateway of a home automation system or other third-party premises system according to an aspect of the disclosure. An embedded engine is indicated at the embodiments described with reference to FIG. 5 above, for example. The embedded engine 600, which includes software and typically firmware, provides embedded control logic 612 required to run on or in coordination with a premises gateway to, for example, manage lighting scenes for emergency situations, monitor unauthorized use of selected lighting scenes, patterns, and colors, enable priority overrides, provide multi-gateway synchronization, and scheduling of scene activation. The embedded engine software 600 can be physically resident on the gateway device or on another device connected thereto. The typical embedded engine will include an API that can be accessed over a local or remote network.

In some embodiments, especially where color-changing lighting control is provided as part of a third-party platform, system, or service, the color-changing lighting control and connectivity software 525 and 527 communicates with embedded engine software 600 at a third-party controlled premises gateway or system. For example, a home automation system 602 includes a computer 604 operably connected to devices providing connectivity with the Internet. Connectivity can be supported via Wi-Fi 606 or Ethernet 608 connections, for example. Similarly, connectivity is provided between the system 602 and the premises color-changing lighting controllers, such as via a ZigBee radio 608. The ZigBee radio can communicate using, for example, the ZigBee Light Link (ZLL) standard 611. A Virtual Private Network (VPN) client 614 is preferably embedded as well to provide secure connections over a selected network connection.

The computer 602 runs the embedded engine software and/or firmware. An API Interpreter 610 decodes API requests incoming from the Cloud and facilitates requested logic instructions for lighting control. The embedded engine provides support, API interpretation, and compatibility for the local system 602 enabling communication with and control of the color-changing lighting. The embedded control logic 612 provides the processing decisions required for operation of current and future lighting scenes and coded lighting schemes. The embedded software and firmware is upgradable so changes can be pushed to target devices when updates and new features are available.

For premises having multiple gateways or systems, a Real Time Clock 616 (RTC) is integrated to provide the ability to synchronize multiple gateway devices. The RTC associated with a gateway allows synchronization via RTCs associated with the other premises gateways. The RTC allows all gateways that have been grouped together providing lighting control to execute scheduled lighting scenes, even where cloud connectivity is unavailable. The stored schedules and scenes 618, for example, schedules and scenes 618a-c, can function autonomously and ensure that a color-changing lighting pattern and/or color is executed seamlessly across all lighting units, thus providing a smooth visual experience.

Figure 9:
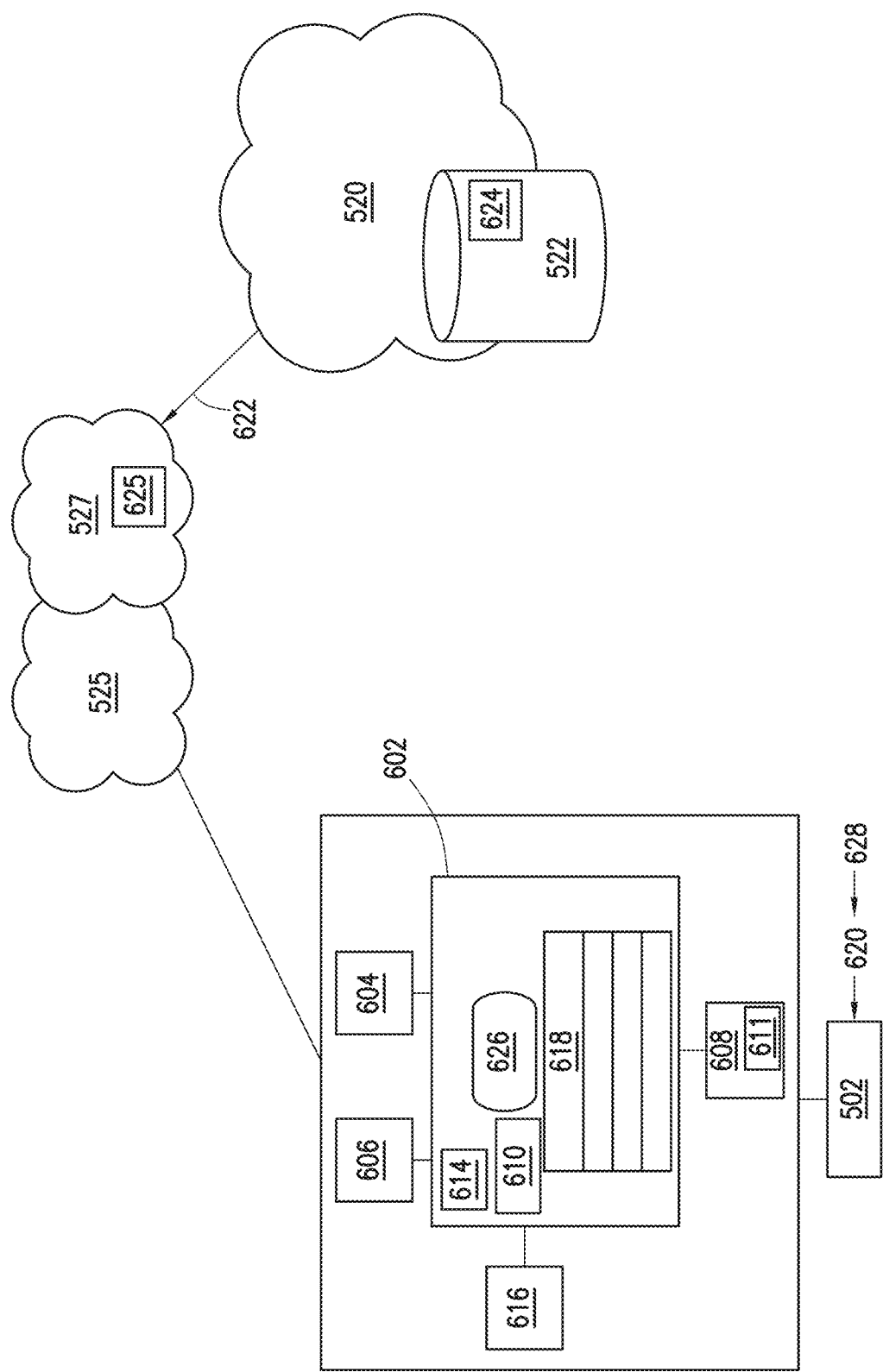
FIG. 9 is a schematic of an exemplary system and method for providing priority overrides according to an aspect of the disclosure.

FIG. 9 Priority Management

FIG. 9 is a schematic of an exemplary system and method for providing priority overrides according to an aspect of the disclosure. The color-changing lighting control system is capable of managing priorities across multiple simultaneous or overlapping color-changing lighting scene activations and/or incoming priority requests from an API.

The hierarchy of priorities is selected and is inherently resident in associated priority software and coding. For example, a priority hierarchy can have multiple levels. Level 1 is typically an incoming emergency request (i.e., Enhanced 9-1-1) and always overrides any current color-changing lighting scene. Similarly, an activated emergency request overrides and prevents any later scheduled or other non-emergency request. An activated emergency scene can only be altered by a subsequent emergency request (e.g., color coded lighting scene change to indicate a different type of emergency or indicate a verification of an emergency, an "end alarm" request from a verified source, etc.). Level 2 can be a request from a security alarm on the premises, such as from a security wall panel, a break-and-pull alarm, etc. Level 3 can be requests from a security monitoring service. Level 4 can be requests from preferred, real-time, or selected control services to which the system is subscribed. For example, where the color-changing lighting control system includes an active subscription to one or more third-party content (e.g., scene) providers, requests from those providers can be prioritized according to the provider or according to the type of request. For example, the system can prioritize requests from provider A over provider B. Similarly, the system can base priority on an indication of scene type, favoring real-time and synchronized lighting scenes (e.g., for sporting events, concerts, etc.) over subscription holiday scenes. Similarly, the prioritization can favor manually selected scenes over subscription and/or scheduled scenes. Further, a Level 5 priority can be user input or subscription scenes using greater than two colors which are not monitored. Level 6 can be for single-color lighting. Persons of skill in the art will recognize other variations and levels based on these examples.

FIG. 9 shows a premises having embedded software and/or firmware engine 600 in use on an exemplary home automation system computer 602 and having connectivity supporting devices 604, 606 and 608. Other elements of FIG. 9 are discussed in detail with reference to FIG. 8, with like numbers identifying like parts, and will not be discussed here in detail.

An Enhanced 9-1-1 provider, or other end-user, has resident on its network system an embedded software and/or firmware engine 507, or similar, which includes an API allowing communication with the color-lighting control software (as operated by an independent provider, a third-party licensee, etc.). Included in the embedded engine, with corresponding counterpart software and data at the control provider, is a "Key," configuration file, or similar software or code used for identification and authentication. A configuration file will typically contain a user name, password, personal identification number (PIN), a shared "secret," etc. Authentication methods are typically used to authorize use of computer services and are known to those of skill in the art. Authentication methods include software tokens, time-based tokens, public-key or asymmetric cryptography, two-factor or multi-factor authentication, e-Authentication, etc. A set of pre-defined priority levels, message types, etc., are assigned to each Key and stored in a configuration file, at the end-user network and/or at the provider network. For a 9-1-1 entity, the Key would typically indicate the highest priority only since all messages are anticipated to be of an emergency in nature. Further prioritization can occur, for example, where the 9-1-1 entity provides an initial message indicating a suspected emergency or an emergency type, and later provides verification of the emergency or a change in emergency type.

When a Key is assigned to an entity, their security and priority levels will be generated as a part of the Key. The priority levels can include multiple levels as well as associated logic (e.g., if-then priority level assignments). When the developer makes a valid API call to the control provider via the internet, which is then passed to a gateway device with an enabled embedded engine, the Key is examined and priority set for the particular request. The assigned Key will be tied to the developer level for which they have paid or been assigned.

FIG. 9 provides a visual representation of a typical priority override scenario. Presume a color-changing lighting scene is currently running (at 620) on all controllers connected to a gateway device. A 9-1-1 services provider issues (at 622) an API call tied to an emergency request. The 9-1-1 provider's Key (at 624) is authenticated (at 625) by the administrative software 527 and has an assigned highest priority (e.g., Level 1) for execution when received by a premises gateway, thus overriding any current operation of the connected controllers. At the premises, the incoming request is analyzed, decoded, and applied (at 626) as necessary and according to the request priority. As a Level 1 priority request, the request overrides (at 628) the current scene operation 620, which has an assigned lower priority level. The higher priority scene associated with the new activation request is implemented by the lighting controllers 502 on the color-changing lights.

Thus, disclosed is a priority-bound request system, with each requestor authenticated by the system, each requestor assigned one or more priority levels and request types. Preferably each requestor and request is also verified using a two or more step verification procedure.

Figure 10:
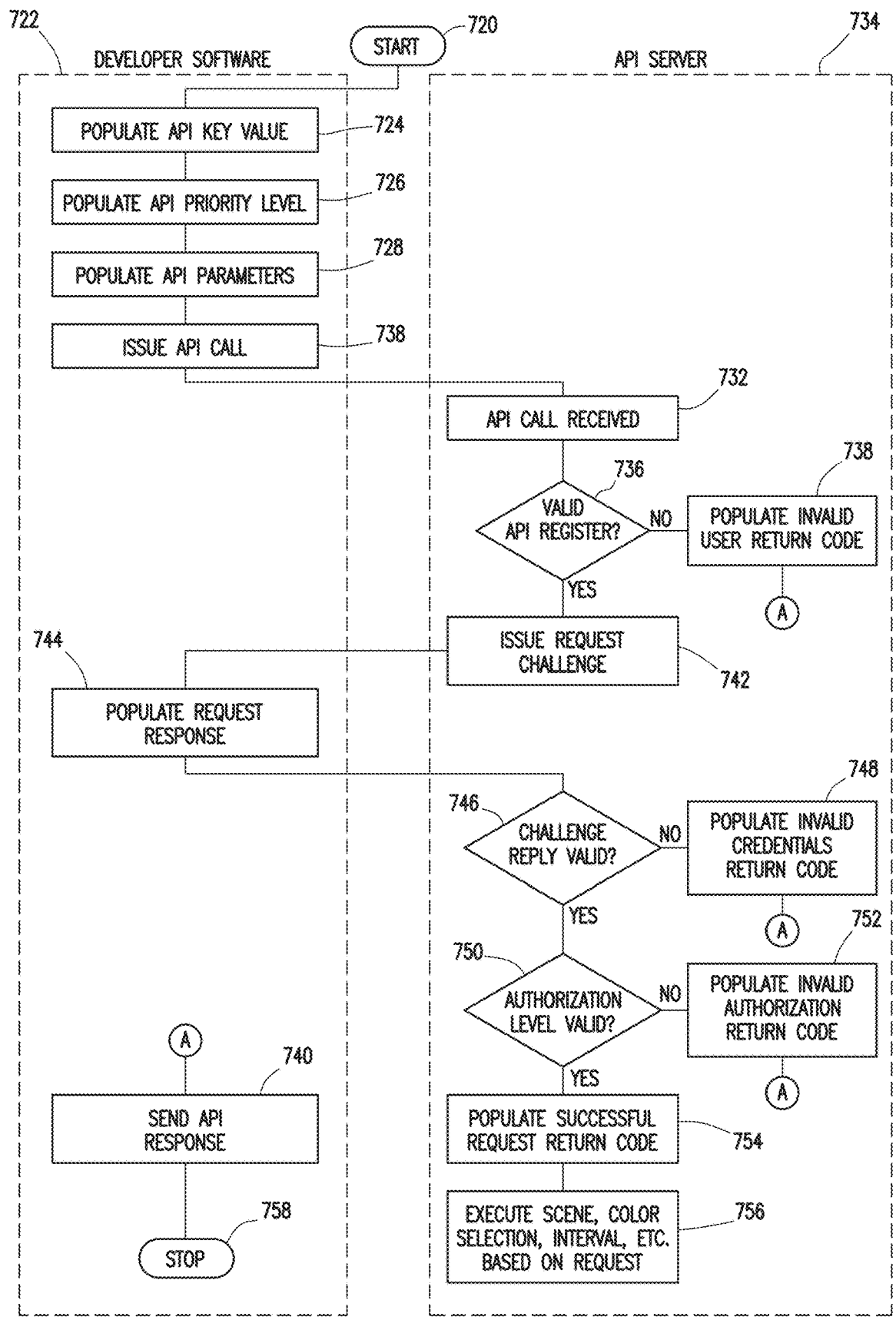
FIG. 10 is a schematic of an exemplary work flow for handling an API request and providing authorized access according to the disclosure.

FIG. 10 API Request Flow Chart

FIG. 10 is a schematic of an exemplary work flow chart for handling an API request and providing authorized access according to the disclosure. It is not discussed here in detail as a person of skill in the art will understand the flow chart, steps thereof, decision points therein, and will recognize additions, changes, and omissions which are possible.

The flow chart begins at Start 720 and proceeds to the Developer Software 722 wherein API fields are populated. At box 724 an API key value is populated. At box 726 an API priority level is populated. At box 728 other API parameters are populated. At box 730 an API call is issued.

At the API server 734, the API call is received at box 732. The API server determines whether the API call is valid at 736. Validity can include requirements for identification, registration, formatting, API key value, priority level, and other parameters, etc. If the API is determined to be invalid, an invalid user return code is populated at 738. The response is sent at box 740 to the Developer Software. If the API call is determined to be valid, a request challenge is issued at box 742 from the API server.

The Developer Software, upon receiving the challenge, populates a request response at box 744 which is transmitted to the API server. The API server at box 746 determines if the response is valid. If not, the API server populates an invalid credentials return code or message at box 748 which is transmitted to the Developer Software at box 740. If the response is valid, the authorization level is checked for validity at box 750.

If the authorization level is determined to be invalid, the API server populates an invalid authorization return code at box 752 and transmits the code to the Developer Software at 740. If the authorization level is valid, the API server populates a successful request return code at box 754. Having been verified, the color-changing lighting control "scene" or commands are then executed by the API server or other controller at box 756. If verification procedures fail, the method moves from box 740 to Stop at box 758

FIG. 11 Color Code

A color code is established to uniquely identify and distinguish between types of emergency and/or conditions. A color code can incorporate several variables, such as color, changes in color, lights on and off, hold times, repetition, and other lighting effects such as fade-in, fade-out, brightness, etc. For example, the code can use "flashing lights" where each "flash" comprises a time period of a light being on (hold time) and a time period with the light being off (hold time). The duration of the hold times can be selected and can also be part of the code. Further, each lighted period has an associated color (e.g., red, green, white, etc.). The color can be part of the code. The code can also employ a repeated "pattern" of flashes to communicate a message.

One or more changes to a currently operating emergency code can be used to indicate a change of condition. For example, a change in color can indicate a re-classification of emergency type, a change in hold times or fade effects, for example, can be used to indicate that the emergency has been verified by a particular source or number of sources, a unique change in lighting code can indicate an emergency response team is in-route or has arrived, etc.

Figure 11:
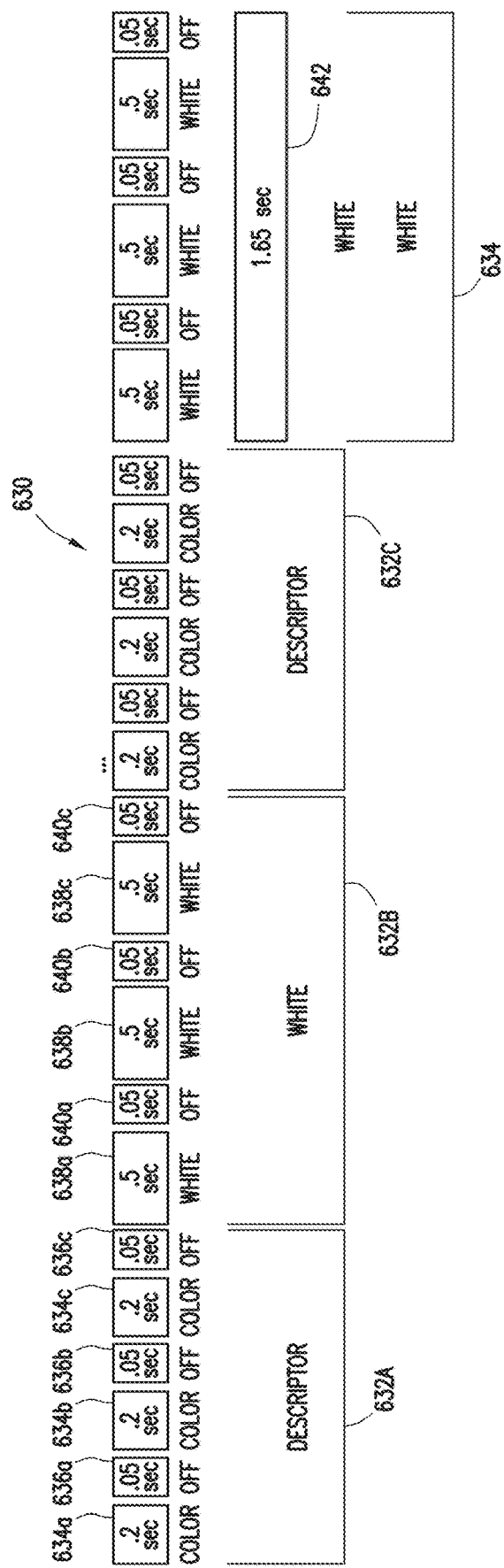
FIG. 11 is a schematic illustrating an exemplary and non-limiting code according to an aspect of the disclosure.

FIG. 11 is a schematic illustrating an exemplary and non-limiting code according to an aspect of the disclosure. The exemplary code consists of a menu of messages, each message indicated by unique combinations of light on/off patterns, color selections, and hold times. The indicated message light patterns roughly follow the traditional Morse Code signal for indicating an emergency, namely the sequence for S-O-S (i.e., ". . . - - - . . ."). Alternating lights on and off, and on and off hold times, are used in the message, along with selected hold times between message segments. Additionally, color alternation between message segments is employed, where a message segment uses a selected (non-white) color, followed by a message segment using white light, and then followed by a message segment with the selected color. The non-white, color selection, used in the first and third message segments, is used to indicate the type of emergency. Red indicates a fire emergency (i.e., an emergency to which a fire, or fire and rescue, team would typically respond), blue indicates a police emergency (i.e., an emergency to which a police officer would typically respond), green indicates a medical emergency (such as for response by an ambulance), yellow indicates a weather emergency. An undefined emergency type can be indicated by a different code, for example, a red and blue alternation within one or more segments, or non-repeating colors for and/or within selected message segments.

Referring to FIG. 11, a color-changing lighting, coded message 630 is indicated as having a plurality of message segments 633A-C. Here, the message segments are of unequal duration, with message segments 633A-C of 0.75 seconds and message segment 634 of 1.65 seconds. Each message segment uses an equal number of elements (i.e., total number of times the lights are on plus number of times the lights are off). The first message segment 632A consists of three elements 634a-c with lights on of a selected color, alternated with three elements with the lights off 636a-c. Each "lights on" element hold time is 0.2 seconds and each "lights off" element hold time is for 0.05 seconds. The second message segment 632B consists of alternating three "lights on" elements in white 638a-c, and three "lights off" elements 640a-c. Each white "light on" hold time is 0.5 seconds and each alternating "light off" hold time is 0.05 seconds. The third message segment 632C repeats the pattern of the first message segment 632A. The first and third message segments 632A and 632C can be referred to as "Descriptor" segments since the non-white color of the light selected for those segments determines the type of emergency indicated (e.g., red for fire, blue for police, green for medical, yellow for weather, red/blue for undefined). The message segments 632A-C combine to create a coded message 630 and indicate the presence of a reported emergency. Message segment 634 in the exemplary embodiment shown is of 1.65 seconds in duration and consists of three white "light-on" elements of 0.5 seconds hold time alternated with three "light-off" elements of 0.05 seconds hold time.

For an undefined emergency (e.g., where a "panic" button has been activated, a 9-1-1 call is made but incomplete, etc.), the lights would use the on-off and duration of hold times similar to the coded message as above, however, instead of a non-white colored light indicating emergency type, a white light would be used to indicate an emergency of unknown type. Upon later identification of emergency type (e.g., by additional 9-1-1 communications, on-site verification by authorities, etc.), the coded message is updated, remotely or locally, to indicate emergency type and the coded lighting message is changed accordingly.

Additional information can be encoded into a message as well. For example, the coded message can be changed to a new message upon verification of the emergency. Such a code could employ the message segments already described, but upon verification of the emergency, one or more segments or elements of the coded message would be changed or added. For example, where a wall-mounted fire alarm is activated, the color-changing lighting message is activated as indicated in FIG. 9 using red for the colored lights. Upon verification (e.g., by a separate call to the 9-1-1 service, a monitored alarm service, etc.), the coded message is requested to and does change patterns or light designations. The change can be subtle, such as changing the lighting code to another similar code, altering or adding a fade effect, etc. For example, verification can be indicated by using the same code but wherein the white and off alternation in the middle message segment 632B includes a fade effect. Alternately, the now-verified emergency coded message can mimic the initial coded message but substitute white light for the "lights off" elements in segments 633A and C. The change can be more readily apparent, such as changing the message to one similar to the initial coded message but wherein segment 634 is simply a single element, for example a white "lights on" with a hold time of 1.65 seconds. Other patterns and changes can be used, such as changing message segment 634 to white "lights on" for 1.60 seconds and "lights off" for 0.05 seconds. Further, hold time changes in a coded message, message segment, and/or message element can be used to indicate changes in a coded message.

Alternately, communication that an initial emergency has been verified can be indicated by including an additional message segment (when compared to the initial message). For example, the verified message can have four segments, including a fourth segment using a different color, hold time pattern, or other distinguishing characteristic (e.g., such as the single message element 642 of white "light on" with a 1.65 second duration).

Further changes in emergency conditions can also be indicated by other changes to the coded message. For example, a first coded message can indicate an unverified emergency of known or unknown type, a second coded message can indicate a verified emergency type, a third coded message can indicate emergency response units are in route or on the premises, etc.

Updates and changes in coded message are made using the same or similar process to that described above with respect to an initial message. That is, the emergency type is verified by a 9-1-1 provider or monitored security services provider, who then sends via the internet the appropriate identification and message signals to the premises or color-changing light services provider. Identification and subscription verification procedures are followed as in the initial emergency lighting procedures.

Figure 12:
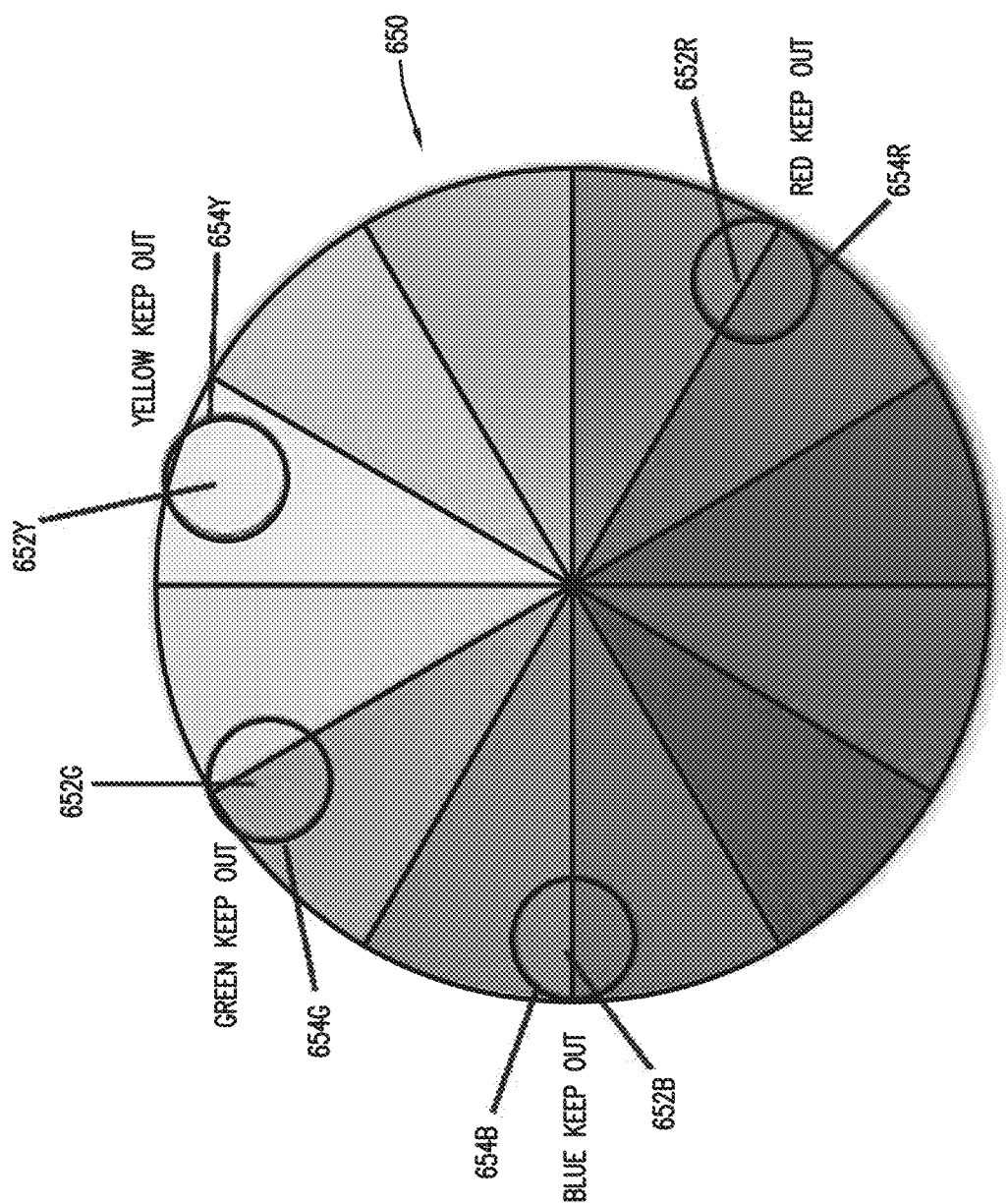
FIG. 12 is a schematic indicating a typical color wheel and color restriction areas designating according to an embodiment of the disclosure.

FIG. 12 Color Control Logic

FIG. 12 is a schematic indicating a typical color wheel and color restriction areas designating according to an embodiment of the disclosure. The color-changing lighting control and administrative software 525 and 527, embedded engine logic 507, or other associated software or logic, preferably include restrictions such that the end-user and third-party users are prevented from creating or activating color-changing lighting scenes which are confusingly similar to the selected emergency scenes. The restrictions are implemented in the API to limit and control the ability to create or activate the restricted scenes, or similar scenes, to prevent false alarms, confusion by the public or first responders, etc.

The color wheel 650 maps a large number of individual colors 652, each of which is identified, preferably by corresponding numeric values, as is known in the art. The wheel here is shown in black and white and with very few colors due to the limitations of the paper format. The color wheel or other color identification system used in the disclosure can vary, having a wide range of identifiable colors, with or without darker and lighter shades, etc., with corresponding numerical or other values. Preferably, the primary colors (red, blue, green) are each a single point on the wheel. The control logic or software has stored data indicating the exact colors used in the emergency color system. Additionally, the software also identifies a restricted color area or "keep out" area for the colors surrounding the selected emergency colors on the color wheel. Keeping with the exemplary colors above, the selected emergency color "red" 652r and those colors immediately surrounding red, indicated by color area 654r, are monitored colors. Similarly, the software also monitors the blue color 654 and corresponding color area 654b, green color 659 and color area 654g, and yellow color 652y and color area 654y.

Figure 13:
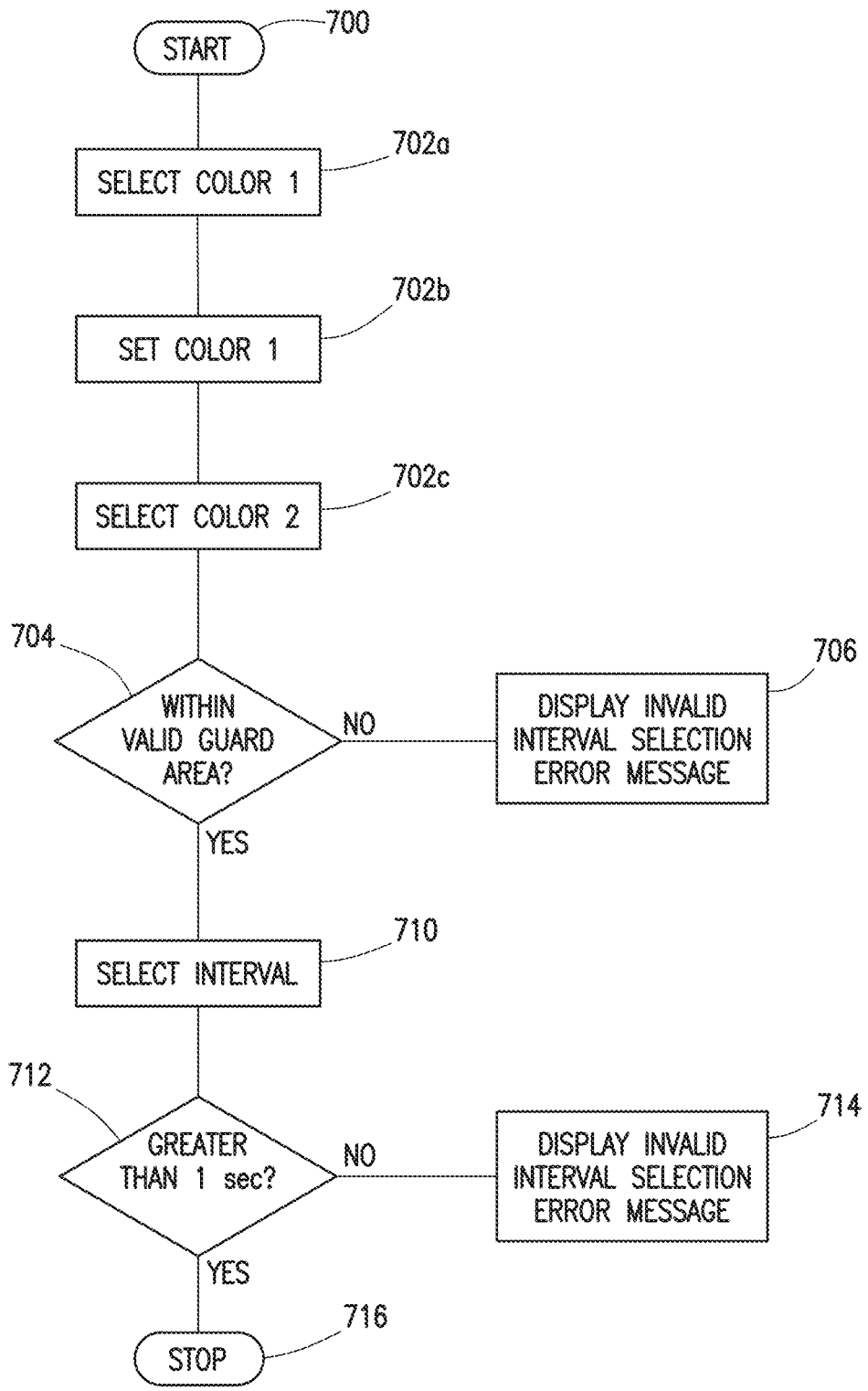
FIG. 13 is a flow chart of a method implemented by software or software logic for monitoring and preventing creation of scenes by unauthorized users which are confusingly similar to the designated emergency scenes according to an aspect of the disclosure.

FIG. 13 Lighting Scene Comparison Flow Chart

FIG. 13 is a flow chart of a method implemented by software or software logic for monitoring and preventing creation of scenes by unauthorized users which are confusingly similar to the designated emergency scenes according to an aspect of the disclosure. The color-changing lighting control system allows scene creation by authorized users, such as end-users at the premises, or third-party licensed lighting service providers. Such persons can be authorized to a selected level, allowing creation of scenes dissimilar to the emergency scenes, but not authorized to a necessary level allowing for creation or implementation of scenes similar to or matching the emergency scenes. Alternately, no user is authorized to create such scenes as they are provided exclusively with the system to insure consistency and prevent "false alarm" scenes.

The color-changing lighting control system, either at the embedded engine 507 or at the primary control software 527, monitors the creation or implementation of scenes by the user. The intent is to prevent any of the emergency color codes and patterns (see above) from being executed by an unauthorized entity. The software compares the user scene to the designated emergency scenes. The comparison can be for one or more scene elements, such as use of selected colors 652 and/or within selected color areas 654; colored and/or white "light on" hold times of selected durations (e.g., under 1 second, under 0.5 seconds, etc.); and/or repetition of a non-white color "light on" and "light off" a selected number of times (e.g., three "light on" elements of the same color separated by "light off" elements). Other scene elements can be monitored as well, such as alternating lighted colors which mimic the emergency code messages, such as by alternating a selected color (e.g., red or red area) with a very dim light (low brightness) or dark color (e.g., brown, gray, black). The monitoring software can prevent a user at the step of scene creation, saving a scene, or activating a scene. Additionally, the software can display to the user a warning message at any of these points. If a scene is being saved in the creation process and the user account is not validated to the appropriate security level, the sure will not be able to save the scene for distribution to devices.

FIG. 13 is an exemplary flow chart for monitoring of user-created color-changing lighting scenes. A user begins creation of a scene at 700 and selects one or more colors for use in the scene at 703-c. At 704, the monitoring software program compares the selected colors against a set of selected protected or guarded colors, as explained above. A display is presented to the user indicating invalid color selection at 706. If the color selection is valid, the user selects time intervals for the lighting at 710. The timing can then be monitored against selected protected or guarded lighting times or durations at 712. Again, an invalid alert is displayed at 714 or the process continues to a stop 716.

Use Cases

There are a number of use cases that exist where architectural, color-changing lights provide a unique signaling capability that augments and/or provides only a visual cue that is tied to a specific emergency condition. The Color Code discussed above is used to convey the nature of a given emergency. The following provides examples of specific use cases that leverage the Color Code concept.

Retirement communities are growing in number as the baby-boom generation ages and is in search of comfortable, monitored communities where they can maintain independent living while having the peace of mind knowing that assistance is available as needed. Typically, the facilities cover large community-styled geography and are intended to be non-intrusive and accessible. The use of architectural, color-changing lights can facilitate a number of informative and emergency support conditions. Examples include, fire, police and medical need along with informative weather alerts. Since many of these properties are self-contained, the implementation of uniquely addressable lights on each individual residence can provide immediate notification of an emergency if a resident is incapacitated and cannot reach a phone or other mechanism to communicate. Lights can be potentially integrated with senior care solutions that monitor safety and provide "panic button" services if an individual has a fall or other emergency condition.

Although hurricanes are slow-moving, many individuals often delay or forego evacuation resulting in unnecessary and preventable loss of life. Color-changing lights, when tied into weather-related agencies/services can provide visual information that could influence a person's decision to stay put during a slow-moving hurricane. Color codes would provide real-time visual cues as to the increased severity of a storm and/or the ability to easily relocate to a safe location via evacuation.

Earthquakes are a challenge when it comes to prediction. Scientists have perfected the ability to anticipate an earthquake event and can actually provide limited advanced warning which, under the right circumstances, can potentially preclude injuries or death. There are several geological services that provide early warning systems that can be accessed via software to provide additional methods of access to alert information. Some of these systems can provide up to 10 to 20 seconds of advanced warning time prior to an event. In most instances, this will allow people to safely seek shelter or avoid areas where they may be exposed to greater risk. The use of these systems and interfaces will provide the ability to support a visual, color-coded alert in advance of an earthquake event. People will know to shelter in place quickly or avoid structures where a collapse or falling debris could pose a danger.

Tornadoes, like other weather events, have many existing early warning systems. A limiting factor is that most emergency messages are broadcast by nature. The implementation of color-coded warnings could be implemented to target a specific location or locations thus improving the accuracy and focus of the warning system.

Hail events, along with severe thunderstorms and lightning, are similar to the tornado scenario in that they are geographically specific. The use of color-codes for hail and severe thunderstorms/lightning can also serve as a much more focused alerting mechanism for dangerous weather.

Tsunami detection, like earthquake detection, has advanced in recent years. Tsunami detection actually provides additional time since the developing wave travels longer distances and is affected by water density and physics thus allowing more time to safely evacuate people from lower-lying areas. Tsunami events benefit in much the same manner as other weather and seismologic events whereby color-coding a visual alert in potential areas of peril is greatly enhanced due to specific, location and event based information.

Universities and other educational institutions have even more choices as to how architectural, color-changing lighting benefits their institutions. They can take advantage of all the above-mentioned weather/emergency events and can benefit by integration of any active shooter alerting system currently available. Again, color-coding information specific to an event can provide those that do not have access to other means of communication can be alerted via the ambient campus environment lighting system. An additional benefit for learning institutions is that school colors can be implemented and managed for regular and special events throughout the academic year.

Use of VPN Connection

As described above, the disclosure supports both 9-1-1 and commercial implementations. In an embodiment, for security enhancement, only 9-1-1 providers having a VPN connection to the system server and the lighting controller software are authorized to issue requests to enable any of the emergency scenes. All transactions will be validated according to developer key information and will be logged. Such a security measure can be optional or not apply to commercial providers which can, for example, utilize a simple HTTPS connection.

API Features

In a preferred embodiment, the control API is designed around industry standard RESTful formats and architectures, thereby allowing existing developers to easily integrate lighting control into their applications without having to understand the hardware details. The following are exemplary approaches of how an API can be formatted and operated: RESTful format; HTTPS enabled; API Key is generated in an Inception Innovations Developer Portal account; Request format: https://api.inception.com/request-.json employing a Token (API key), User Identification (user key displayed in developer account), and API Request. Where an alarm panel is activated, a callback can be implemented for data push from the control system. A throttle metric can limit the maximum number of calls allowed in a given time period. The VPN connection can be designated for only 9-1-1 communications. Request Logging can include the API, user key, and other data with date and time stamp per request. API Calls can use steps such as List Scenes, List Groups, List Ballasts, Execute Scene (use existing scene name) (for Group, Ballast, or All), and on/off (for a Group, Ballast, or All).

In one embodiment, the system supports the use of a panic button to signal emergency information to the control system. A panic button can be virtual (software) or a physical button or similar mechanism. When activated, a formatted signal is generated and sent to the system using processes described herein. The panic button should conform to existing emergency and municipality codes that are required for existing fire pull stations.

In one embodiment, the system supports an emergency alert station, such as a pull station, used to signal specific emergency information to the control system. The pull station will be comprised of pull latches (similar to existing fire alarm pull stations) with a label indicating the station is for emergency use. When the latch is pulled, a series of buttons, latches, or similar mechanisms are uncovered, each mechanism color coded and labeled for a specific emergency type (fire—red, police—blue, medical—green, weather—yellow). When an emergency type button is activated, a formatted signal is generated and sent to the control system using the aforementioned concepts. The pull station should conform to existing emergency and municipality codes required for existing fire pull stations. Additionally, the pull station can be outfitted with a camera that can send either photos or video to the security monitoring service provider or other authorized persons in order to further verify the emergency.

In an embodiment, the system includes a security specific device that will leverage the concepts discussed herein. The device will be implemented exclusively to provide visual security information. The controller and lighting components are consolidated into a single physical component for installation at a customer location and activates only upon security specific events. The events can be communicated from any of the licensed providers or directly from the control system. The security specific device should conform to existing emergency and municipality codes required for existing visual alert mechanisms.

Figure 14:
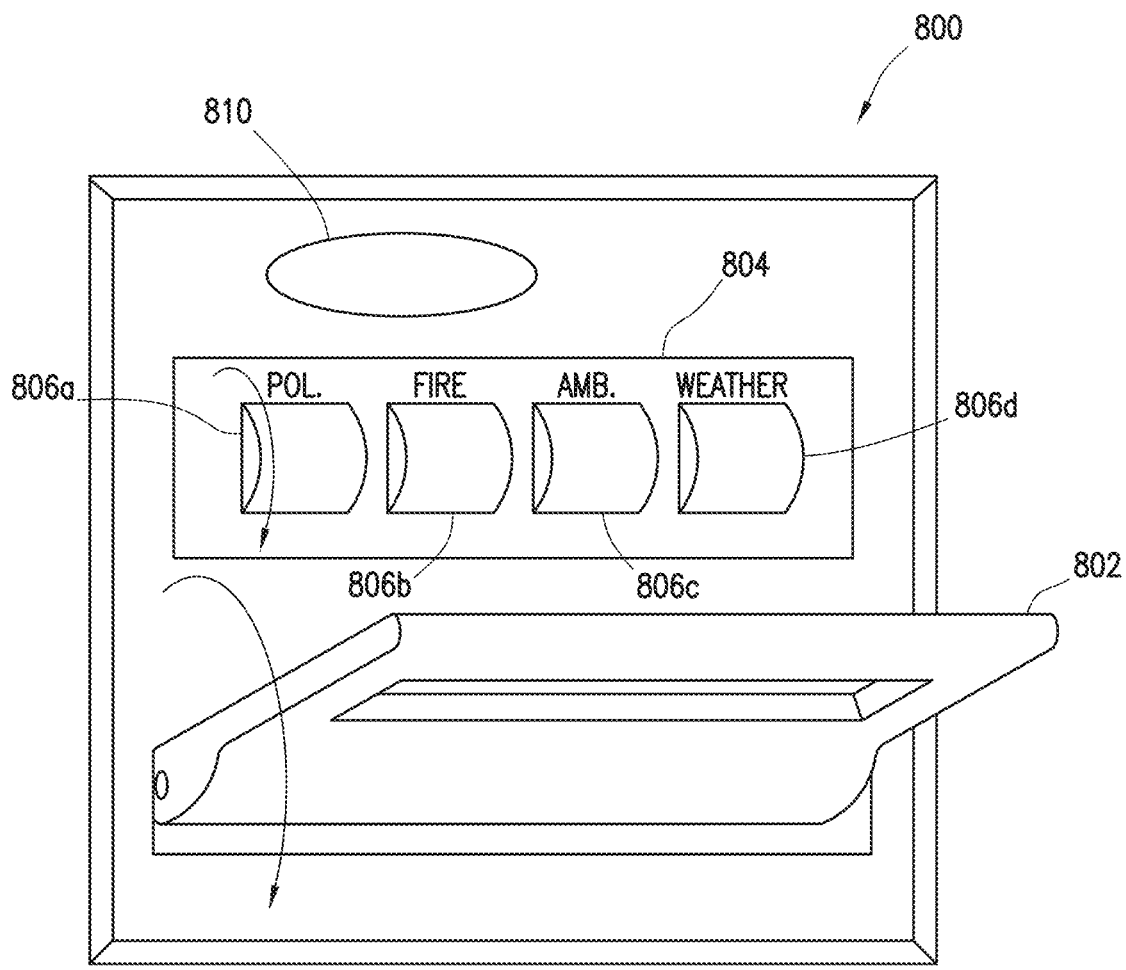
FIG. 14 is a schematic of an exemplary alarm mechanism in accordance with the disclosure herein for use in public buildings.

FIG. 14 Public Alarm Station

FIG. 14 is a schematic of an exemplary alarm mechanism in accordance with the disclosure herein for use in public buildings. The device 800 at FIG. 14 can be considered a replacement of the typical public alarm devices installed in public buildings, such as red pull-levers, hammer-and-glass alarm pulls, etc. The device 800 is particular to the color-changing lighting emergency lighting systems described herein.

The device 800 is envisioned for installation at a building, as a replacement or addition to existing audible alarm systems. A mechanical actuation mechanism 802 is utilized similar to those currently known in the art for audible alarm systems. Here, an exemplary lever 802 is provided for manual pulling by the person sounding the alarm. In an embodiment, pulling the lever 802 would activate the audible alarm system. In an embodiment, the lever would activate the colored-lighting alarm system, for example, to a lighting code for an undetermined emergency type or a strobe light system. Alternately, the lever can activate both the audible and colored-lighting alarm systems. A pull lever is shown, but can alternately be any known or later created mechanical actuation device, such as a hammer-and-glass mechanism, etc.

Additionally, after pulling the lever 802 and activating a general alarm, an additional alarm panel 804 is presented to the user. Preferably the alarm panel 804 is not visible to the user prior to pulling the lever 802 or alternate mechanical actuation mechanism. The alarm panel 804 presents multiple mechanical actuators 806a-d for selection and activation by the user. The actuators 806a-d are color-coded, supplied with text identification, and/or symbolic identification to identify for the user which actuator to activate based on the type of emergency to be reported. Activating the actuator will activate a corresponding color-coded emergency lighting system as described herein. For example, the user is presented with push button or pull tab actuators for various emergency types or emergency personnel types, such as fire, police, weather, etc., as explained above. Activation of an actuator 806 activates the corresponding coded, colored-lighting system.

The actuators 806 are preferably mechanical but can also be a user input device such as a touch screen, etc. In an embodiment, actuation of an actuator 806 (or the mechanical actuation mechanism 802) also automatically places a call to 9-1-1 (or local security) which is piped through a speaker 810, whether a speaker panel, handheld device such as a phone receiver, etc., allowing voice communication between the user and emergency personnel.

Conclusion

The above disclosure provides support for various methods, claimed or which may be later claimed. Specifically, this support meets the technical, procedural, or substantive requirements of certain examining offices. It is expressly understood that the portions or actions of the methods can be performed in any order, unless specified or otherwise necessary, that each portion of the method can be repeated, performed in orders other than those presented, that additional actions can be performed between the enumerated actions, and that, unless stated otherwise, actions can be omitted or moved. Those of skill in the art will recognize the various possible combinations and permutations of actions performable in the methods disclosed herein without an explicit listing of every possible such combination or permutation. It is explicitly disclosed and understood that the actions disclosed can be performed in any order (xyz, xzy, yxz, yzx, etc.) without the wasteful and tedious inclusion of writing out every such order.

The advantages of the present disclosure include, without limitation, the ability to increase the effectiveness of a security system by using colored light to indicate the location of an emergency and the nature of the emergency with the use of a color-code. The present disclosure allows first responders to locate and respond to an emergency more effectively and quickly which makes the first responders and the community in general safer. The capability of the present disclosure allows the personnel who operate the Enhanced 9-1-1 system to activate the lights on architectural structures which provides an added assistance to the Enhanced 9-1-1 system to direct the appropriate first responders. The present disclosure provides the ability for a user to give access to service providers to access the color changing lighting in real time to offer value added services that have never been provided before such as having specified light fixtures in a theater to synch and change to the mood and action of a movie to provide an added sensitization to a viewing experience. This feature will allow lighting design programmers to sell their designs for purchase to music and movies which is not currently offered.

In broad embodiment, the present disclosure provides a gateway for the use of colored or color-changing lighting to be integrated into existing control systems including security systems to communicate specific events using a color-code and assign remote third party control as a platform for service providers to offer subscriptions for value added services.

Definitions

Computer/Computerized System

The system, methods, and other embodiments according to the present disclosure include computerized systems requiring the performance of one or more methods or steps performed on or in association with one or more computer.

A computer is a programmable machine having two principal characteristics, namely, it responds to a set of instructions in a well-defined manner and can execute a pre-recorded list of instructions (e.g., a program). A computer according to the present disclosure is a device with a processor and a memory. For purposes of this disclosure, a computer includes a server, a personal computer, (i.e., desktop computer, laptop computer, netbook), a mobile communications device, such as a mobile "smart" phone, and devices providing functionality through internal components or connection to an external computer, server, or global communications network (such as the internet) to take direction from or engage in processes which are then delivered to other system components.

Those of skill in the art recognize that other devices, alone or in conjunction with an architecture associated with a system, can provide a computerized environment for carrying out the methods disclosed herein. The method aspects of the disclosure are computer implemented and, more particularly, at least one step is carried out using a computer.

General-purpose computers include hardware components. A memory or memory device enables a computer to store data and programs. Common storage devices include disk drives, tape drives, thumb drives, and others known in the art. An input device can be a keyboard, mouse, hand-held controller, remote controller, a touchscreen, and other input devices known in the art. The input device is the conduit through which data and instructions enter a computer. An output device is a display screen, printer, or other device letting the user sense what the computer has accomplished, is accomplishing, or is expected to accomplish. A central processing unit (CPU) is the "brains" of the computer and executes instructions and performs calculations. For example, typical components of a CPU are an arithmetic logic unit (ALU), which performs arithmetic and logical operations and a control unit (CU) which extracts instructions from memory, decodes and executes them, calling on the ALU when necessary. The CPU can be a micro-processor, processor, one or more printed circuit boards (PCBs). In addition to these components, others make it possible for computer components to work together or in conjunction with external devices and systems, for example, a bus to transmit data within the computer, ports for connectivity to external devices or data transmission systems (such as the internet), wireless transmitters, read and read-write devices, etc., such as are known in the art.

Server

A server is a computer or device on a network that manages network resources. There are many different types of servers, including remote, live and network access servers, data servers, member servers, staging servers, etc. A server can be hardware and/or software that manages access to a centralized resource or service in a network. For purposes of this disclosure, the term "server" also includes "virtual servers" which can be hosted on actual servers.

Network

A computer network, computerized network, or data network is a communications network allowing computers to exchange data, with networked devices passing data to each other on data connections. Network devices that originate, route, and terminate data are called nodes. The connections (links) between nodes are established using wire or wireless media. Nodes can include hosts, such as PCs, phones, servers, and networking hardware. Devices are networked together when one device is able to exchange information with the other device whether or not they have a direct connection to each other. Computer networks support applications such as access to the World Wide Web (WWW) or internet, shared use of application and storage servers, printers, and use of email and instant messaging applications. Computer networks differ in the physical media to transmit signals, protocols to organize network traffic, network size, topology, and organizational intent.

Gateway

A (control) gateway is a network node that acts as an entrance to another network. In homes, the gateway can be the ISP (internet service provider) that connects the user to the internet and/or a dedicated network service provider. In enterprises, the gateway node often acts as proxy server and firewall. The gateway is also associated with a router, which uses headers and forwarding tables to determine where packets are sent, and a switch, which provides the actual path for the packet in and out of the gateway.

A (control) gateway for the particular purpose of connection to identified cloud storage, often called a cloud storage gateway, is a hardware-based and/or software-based appliance located on the user's premises that serves as a bridge between local devices and applications and remote cloud-based storage and hosted applications and services and are sometimes called cloud storage appliances or controllers. A cloud storage gateway provides protocol translation and connectivity to allow incompatible technologies to communicate transparently. The gateway can make cloud storage appear to be an NAS (network attached storage) filer, a block storage array, a backup target, a server, or an extension of the application itself. Local storage can be used as a cache for improved performance. Cloud gateway product features include encryption technology to safeguard data, compression, de-duplication, WAN optimization for faster performance, snapshots, version control, and data protection.

Firmware

In electronic systems and computing, firmware refers to the combination of one or more hardware devices (e.g. an integrated circuit) and computer instructions, programming or coding, and data that reside as read-only software on those devices. Firmware usually cannot be modified during normal operation of the device. Typical examples of devices containing firmware are embedded systems (e.g., traffic lights, consumer appliances, digital watches), some computers, computer peripherals, mobile phones, and digital cameras. The firmware contained in these devices provides the control program for the device.

Bridge

A "bridge" connects two (local) networks, often connecting a local network using an internet router.

Router

A router forwards data packets along networks and is connected to at least two networks, commonly two LANs, WANs, or a LAN and its ISP's network. Routers are located at "gateways," the places where two or more networks connect. Routers use headers and forwarding tables to determine paths for forwarding packets and use protocols to communicate with each other to configure a route between hosts.

Database

The disclosure includes one or more databases for storing information relating to aspects of the disclosure. The information stored on a database can, for example, be related to a private subscriber, a content provider, a host, a security provider, etc. One of ordinary skill in the art appreciates that "a database" can be a plurality of databases, each of which can be linked to one another, accessible by a user via a user interface, stored on a computer readable medium or a memory of a computer (e.g., PC, server, etc.), and accessed by users via global communications networks (e.g., the internet) which may be linked using satellites, wired technologies, or wireless technologies.

The Cloud/Cloud Computing/SaaS

In computer networking, "cloud computing" is used to describe a variety of concepts involving a large number of computers connected through a network (e.g., the Internet). The phrase is often used in reference to network-based services, which appear to be provided by real server hardware, but which are in fact served by virtual hardware, simulated by software running on one or more machines. Virtual servers do not physically exist and can therefore be moved around, scaled up or down, etc., without affecting the user.

In common usage, "the cloud" is essentially a metaphor for the internet. "In the cloud" also refers to software, platforms, and infrastructure sold "as a service" (i.e., remotely through the internet). The supplier has actual servers which host products and services from a remote location, so that individual users do not require servers of their own. End-users can simply log-on to the network, often without installing anything, and access software, platforms, etc. Models of cloud computing service are known as software as a service, platform as a service, and infrastructure as a service. Cloud services may be offered in a public, private, or hybrid networks. Google, Amazon, Oracle Cloud, and Microsoft Azure are well-known cloud vendors.

Software as a service (SaaS) is a software delivery model in which software and associated data are centrally hosted on the Cloud. Under SaaS, a software provider licenses a software application to clients for use as a service on demand, e.g., through a subscription, time subscription, etc. SaaS allows the provider to develop, host, and operate a software application for use by clients who just need a computer with internet access to download and run the software application and/or to access a host to run the software application. The software application can be licensed to a single user or a group of users, and each user may have many clients and/or client sessions.

Typically, SaaS systems are hosted in datacenters whose infrastructure provides a set of resources and application services to a set of multiple tenants. A "tenant" can refer to a distinct user or group of users having a service contract with the provider to support a specific service. Most SaaS solutions use a multi-tenant architecture where a single version of the application, having a single configuration (i.e., hardware, operating system, and network) is used by all tenants (customers). The application can be scaled by installation on several machines. Other solutions can be used, such as virtualization, to manage large numbers of customers. SaaS supports customization in that the application provides defined configuration options allowing each customer to alter their configuration parameters and options to choose functionality and "look and feel."

SaaS services are supplied by independent software vendors (ISVs) or Application Service Providers (ASPs). SaaS is a common delivery model for business applications (e.g., office and messaging, management, and development software, and for accounting, collaboration, management information systems (MIS), invoicing, and content management.

SaaS is an advantage to end-users in that they do not need to provide hardware and software to store, back-up, manage, update, and execute the provided software. Since SaaS applications cannot access the user's private systems (databases), they often offer integration protocols and application programming interfaces (API) such as http (hypertext transfer protocol), REST (representational state transfer), SOAP (simple object access protocol), and JSON (JavaScript Object Notation).

The description of the various methods are provided here numbered for ease of reference. The numbering does not indicate the order or necessity of steps. However, the steps do reference lower-numbered steps to indicate that the higher-numbered steps can be performed in conjunction with the lower-numbered steps.

The words or terms used herein have their plain, ordinary meaning in the field of this disclosure, except to the extent explicitly and clearly defined in this disclosure or unless the specific context otherwise requires a different meaning. If there is any conflict in the usages of a word or term in this disclosure and one or more patent(s) or other documents that may be incorporated by reference, the definitions that are consistent with this specification should be adopted. The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed. As used herein, the words "consisting essentially of," and all grammatical variations thereof are intended to limit the scope of a claim to the specified materials or steps and those that do not materially affect the basic and novel characteristic(s) of the claimed disclosure. The indefinite articles "a" or "an" mean one or more than one of the component, part, or step that the article introduces. The terms "and," "or," and "and/or" shall be read in the least restrictive sense possible. Each numerical value should be read once as modified by the term "about" (unless already expressly so modified), and then read again as not so modified, unless otherwise indicated in context. Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

While the foregoing written description of the disclosure enables one of ordinary skill to make and use the embodiments discussed, those of ordinary skill will understand and appreciate the existence of variations, combinations, and equivalents of the specific embodiments, methods, and examples herein. The invention should therefore not be limited by the above described embodiments, methods, and examples. While this disclosure has been described with reference to illustrative embodiments, this description is not intended to be construed in a limiting sense. Various modifications and combinations of the illustrative embodiments as well as other embodiments of the invention will be apparent to persons skilled in the art upon reference to the description. It is, therefore, intended that the appended claims encompass any such modifications or embodiments. The particular embodiments disclosed above are illustrative only, as the present disclosure may be modified and practiced in different but equivalent manners apparent to those skilled in the art having the benefit of the teachings herein. It is, therefore, evident that the particular illustrative embodiments disclosed above may be altered or modified and all such variations are considered within the scope of the present disclosure. The various elements or steps according to the disclosed elements or steps can be combined advantageously or practiced together in various combinations or sub-combinations of elements or sequences of steps to increase the efficiency and benefits that can be obtained from the disclosure. It will be appreciated that one or more of the above embodiments may be combined with one or more of the other embodiments, unless explicitly stated otherwise. The methods illustratively disclosed herein may suitably be practiced in the absence of any element or step that is not specifically disclosed or claimed. Furthermore, no limitations are intended to the details of construction, composition, design, or steps herein shown, other than as described in the claims.

The invention claimed is:

1. A method of alerting persons of an emergency situation in a public space having an emergency colored-lighting alarm system, the method comprising:

in response to a user mechanically activating an alarm station, revealing an alarm panel having a plurality of actuators for selection and activation by the user, each actuator corresponding to a type of emergency;

activating an audible alarm in the public space;

in response to the user selecting and activating a first actuator corresponding to a first emergency type, activating the colored-lighting alarm system to display a first color-coded lighting message corresponding to the first emergency type, wherein the colored-lighting system includes a plurality of color-changing lights, and emitting from the plurality of color-changing lights the first color-coded lighting message by repeatedly emitting a first non-white colored light, the repeated emissions of the first non-white colored light alternated with either emissions of white light or emissions of no light, and wherein the first non-white color light corresponds to the first emergency type; and in response to a user selecting and activating a second actuator corresponding to a second emergency type, emitting from the plurality of color-changing lights a second color-coded lighting message by repeatedly emitting a second non-white colored light, the repeated emissions of the second non-white colored light alternated with either emissions of white light or emissions of no light, and wherein the second non-white color light corresponds to the second emergency type.

2. The method of claim 1, further comprising activating a general alarm initially and then, in response to the user activating the actuator, activating the alarm corresponding to the emergency type.

3. The method of claim 1, further comprising: automatically communicating the alarm to emergency personnel.

4. The method of claim 3, further comprising: providing voice communications between the user and the emergency personnel.

5. The method of claim 1, wherein the alarm panel is a touch screen and wherein the actuators are icons displayed on the touch screen, the icons providing identifying information for the emergency types available for actuation.

6. The method of claim 1, further comprising: periodically interrupting the repeated emission of the first non-white colored light, and repeatedly emitting a white light alternated with emission of no light, and then again repeatedly emitting the first non-white colored light alternated with either emissions of white light or emissions of no light.

7. The method of claim 1, further comprising, verifying the first emergency type, and then changing the first color-coded lighting message to indicate the verification.

8. The method of claim 1, further comprising deactivating the alarm station and covering the alarm panel between emitting the first and second color-coded lighting messages.

9. The method of claim 1, wherein emitting the first color-coded lighting message comprises alternatingly: (a) emitting a first message segment consisting of alternatingly emitting the first non-white color light with emitting no light, and (b) emitting a second message segment consisting of alternatingly emitting a white light with emitting no light.

10. The method of claim 1, further comprising emitting a color-coded lighting message including a message segment indicating that the emergency type is unverified.

11. The method of claim 7, further comprising changing the first color-coded lighting message to indicate the verification by adding a fade effect to at least one of the emissions of light.

* * * * *